United States Patent
Sasaki et al.

(10) Patent No.: US 8,922,948 B2
(45) Date of Patent: Dec. 30, 2014

(54) THIN-FILM MAGNETIC HEAD, METHOD OF MANUFACTURING THE SAME, HEAD GIMBAL ASSEMBLY, AND HARD DISK DRIVE

(75) Inventors: Yoshitaka Sasaki, Santa Clara, CA (US); Hiroyuki Ito, Milpitas, CA (US); Kazuo Ishizaki, Milpitas, CA (US); Atsushi Iijima, Shatin (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 1322 days.

(21) Appl. No.: 12/118,259

(22) Filed: May 9, 2008

(65) Prior Publication Data

US 2009/0279207 A1    Nov. 12, 2009

(51) Int. Cl.
*G11B 5/17* (2006.01)
*G11B 5/31* (2006.01)
*G11B 5/127* (2006.01)

(52) U.S. Cl.
CPC .......... *G11B 5/3133* (2013.01); *G11B 5/1278* (2013.01); *G11B 5/3146* (2013.01)
USPC .......... 360/125.02; 360/123.03; 360/123.09; 360/123.12

(58) Field of Classification Search
USPC ............. 360/123.02–123.03, 123.09, 123.12
See application file for complete search history.

(56) References Cited

U.S. PATENT DOCUMENTS

| | | | |
|---|---|---|---|
| 4,656,546 A | 4/1987 | Mallory | |
| 4,672,493 A | 6/1987 | Schewe | |
| 6,504,675 B1 | 1/2003 | Shukh et al. | |
| 6,751,055 B1 * | 6/2004 | Alfoqaha et al. | 360/125.56 |
| 6,781,790 B1 * | 8/2004 | Sasaki | 360/125.5 |
| 2005/0088780 A1 * | 4/2005 | Sasaki et al. | 360/123 |
| 2006/0087765 A1 * | 4/2006 | Iwakura et al. | 360/125 |
| 2007/0195457 A1 * | 8/2007 | Matono et al. | 360/126 |
| 2008/0253032 A1 * | 10/2008 | Narushima et al. | 360/313 |

FOREIGN PATENT DOCUMENTS

| | | |
|---|---|---|
| JP | A-2001-076320 | 3/2001 |
| JP | A-2004-094997 | 3/2004 |
| JP | A-2004-234815 | 8/2004 |
| JP | A-2005-129219 | 5/2005 |
| JP | A-2007-080356 | 3/2007 |
| JP | A-2007-157312 | 6/2007 |
| JP | A-2008-077719 | 4/2008 |

* cited by examiner

*Primary Examiner* — Wayne Young
*Assistant Examiner* — Carlos E Garcia
(74) *Attorney, Agent, or Firm* — Oliff PLC

(57) ABSTRACT

A thin-film magnetic head is constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate. This thin-film coil has a plurality of turn parts arranged at respective positions having different distances from the medium-opposing surface, while a non-expandable part made of an insulating material having a coefficient of thermal expansion smaller than that of a photosensitive resin is formed between the turn parts.

16 Claims, 40 Drawing Sheets

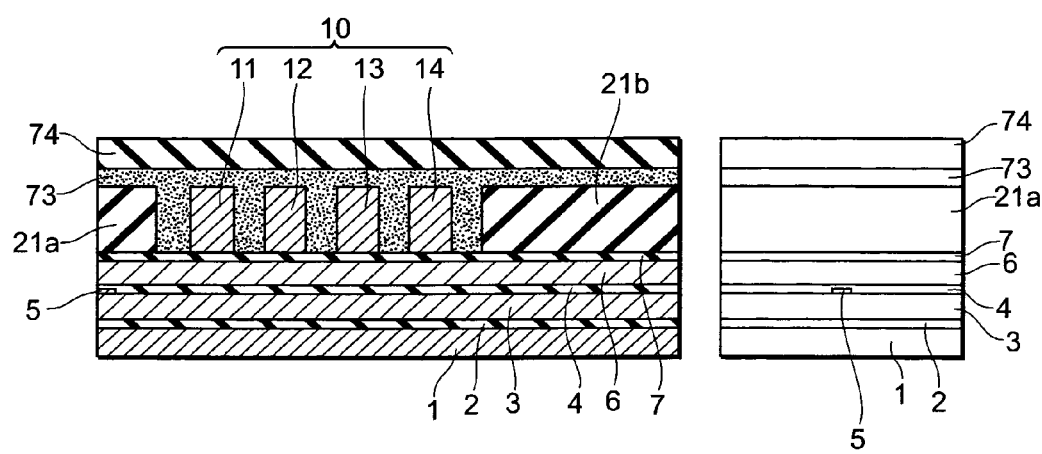
*Fig.6A*  *Fig.6B*

Fig.10A
Fig.10B
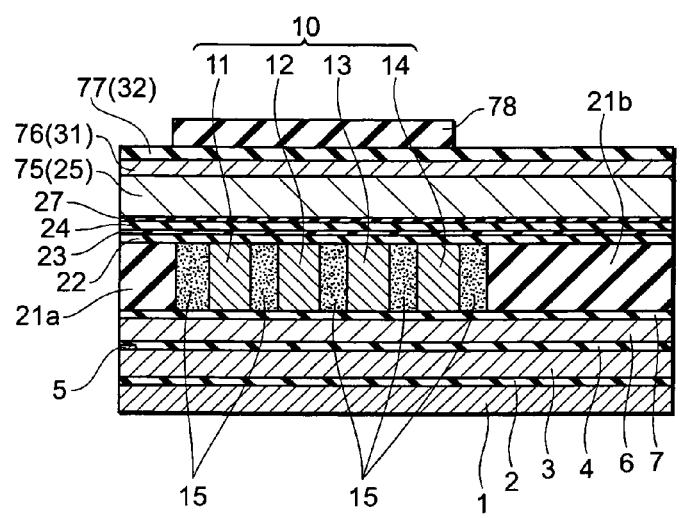
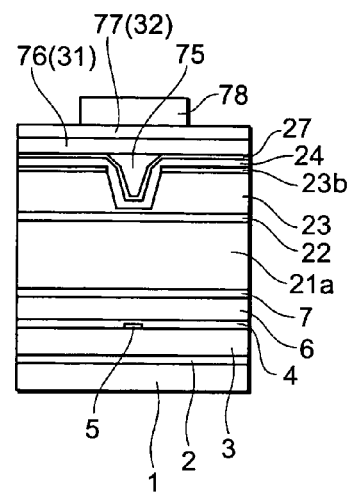

Fig.12A
Fig.12B
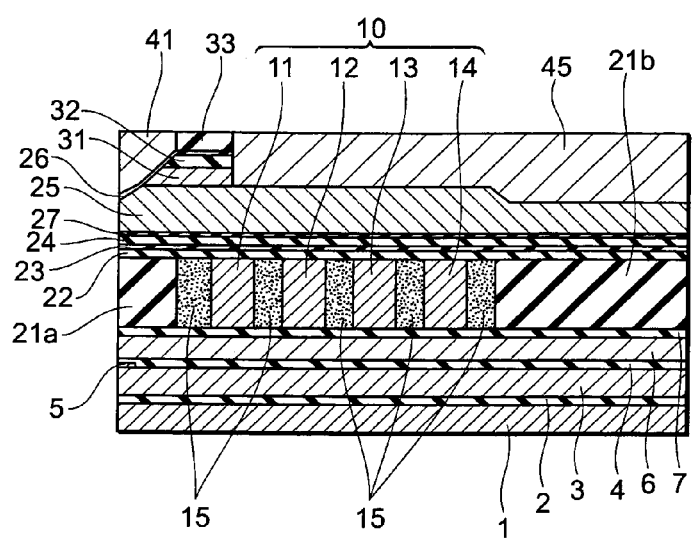
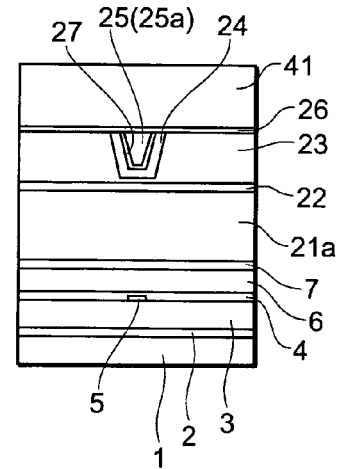

Fig.13A
Fig.13B
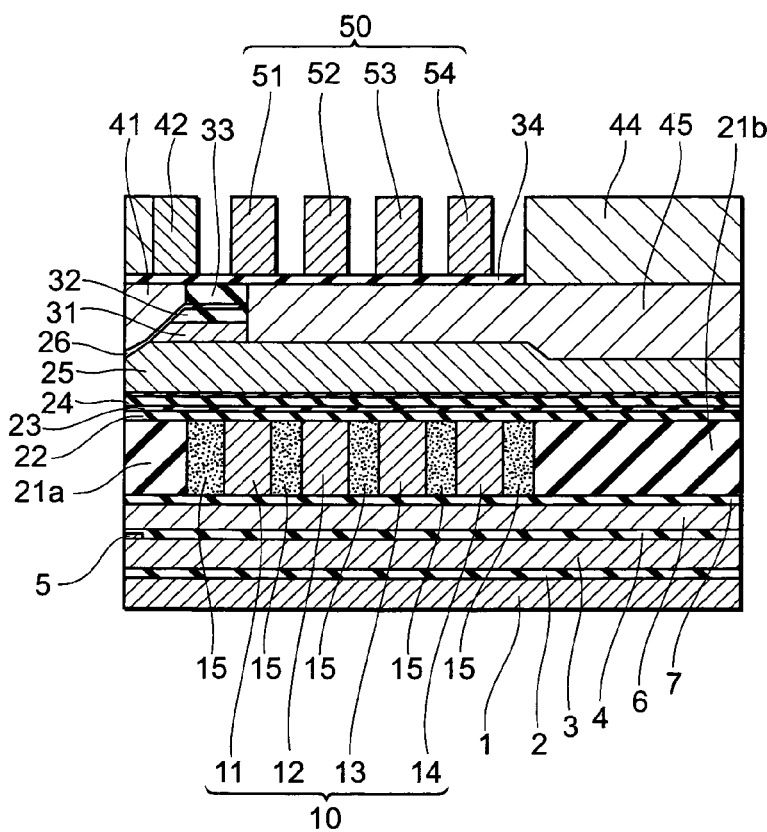
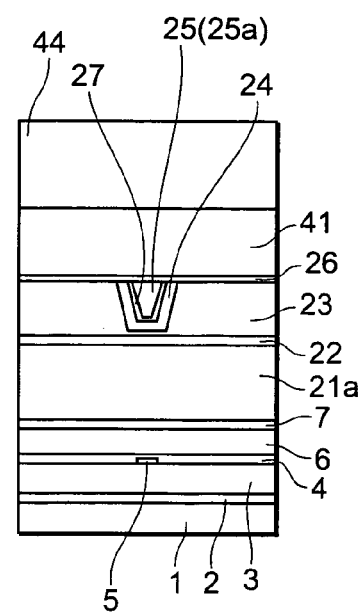

Fig.17A
Fig.17B
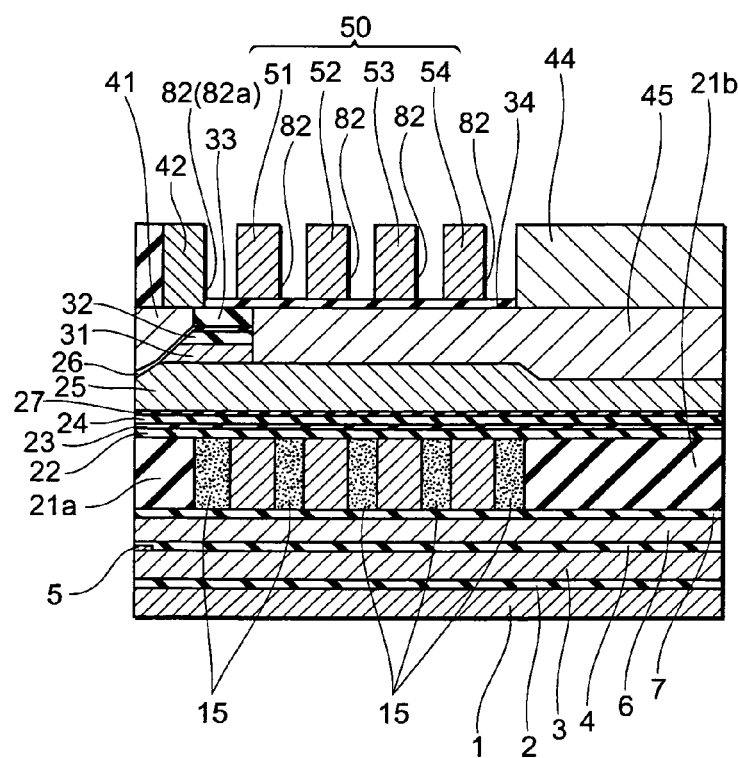
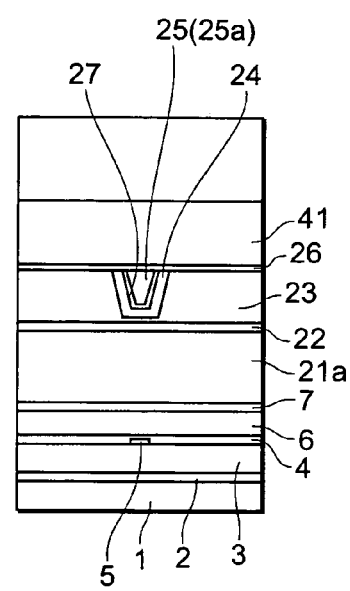

*Fig.25A* *Fig.25B*
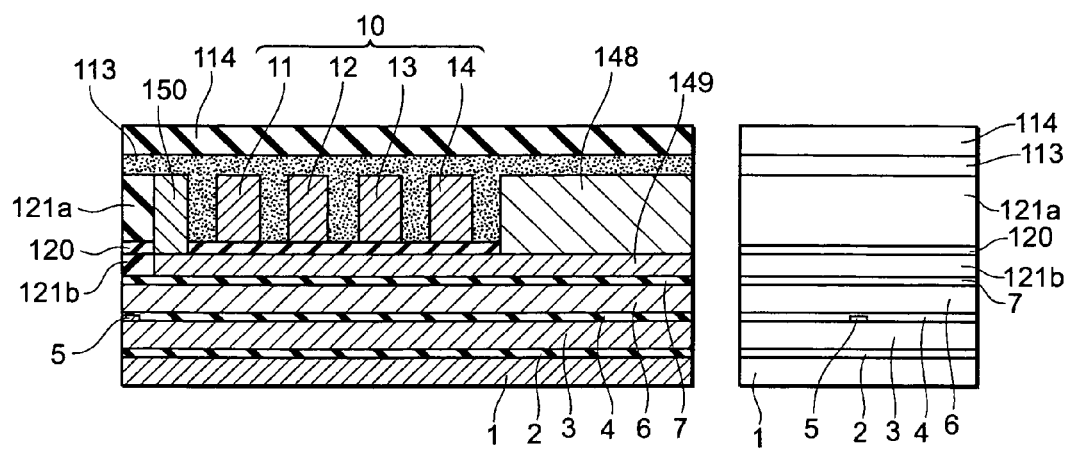

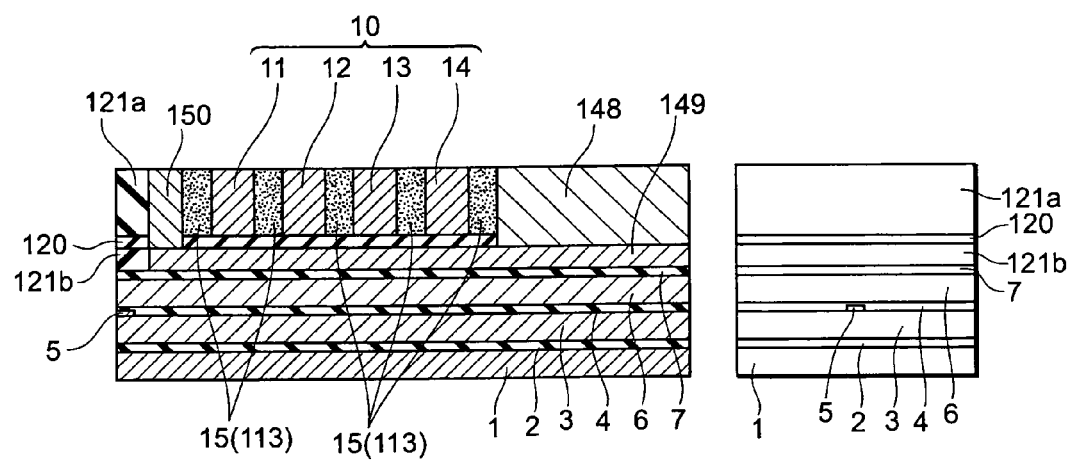
*Fig.26A*  *Fig.26B*

Fig.29A
Fig.29B
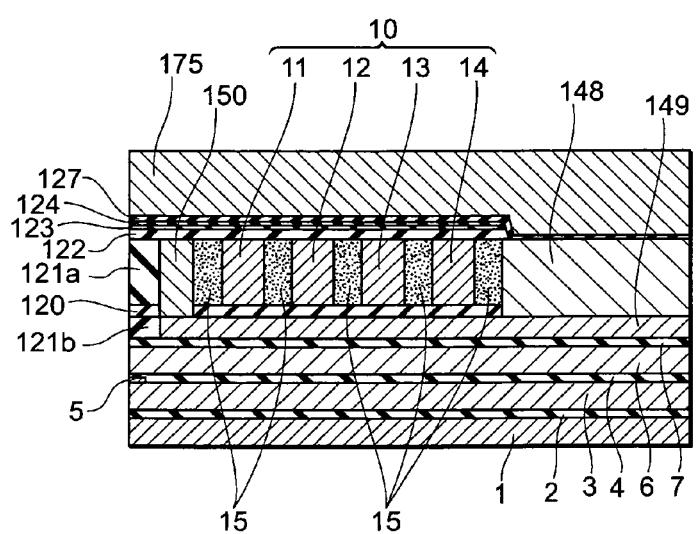
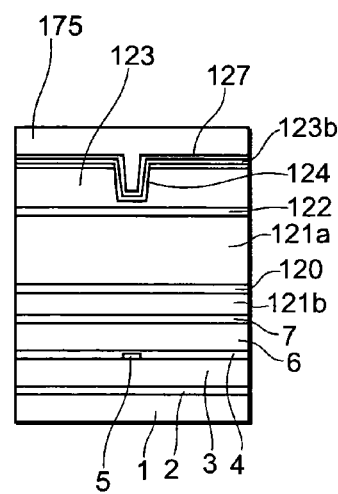

Fig.34A
Fig.34B
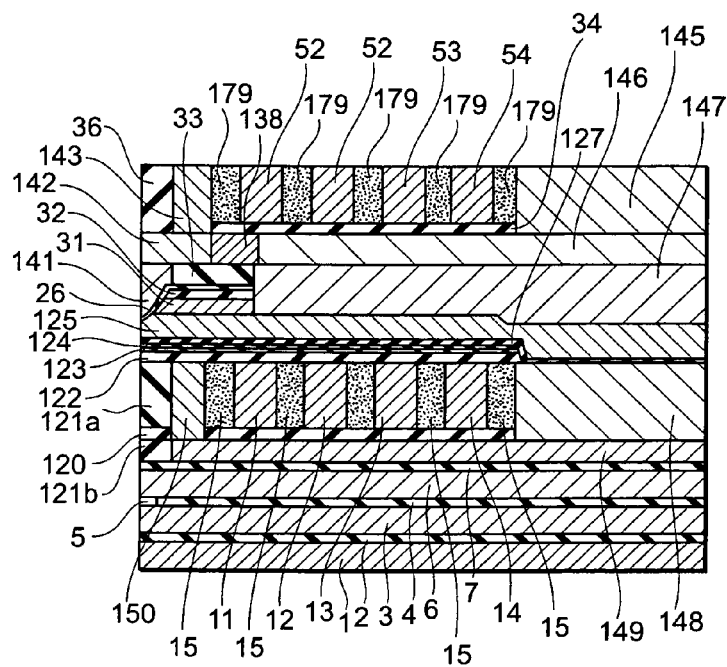
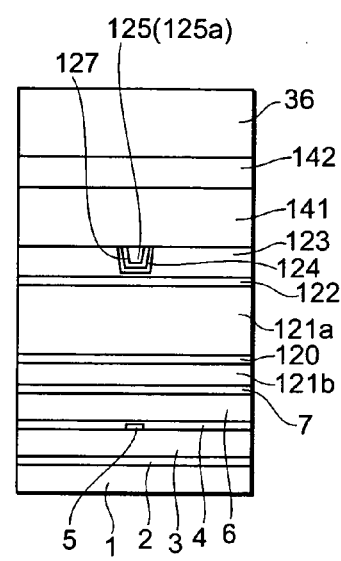

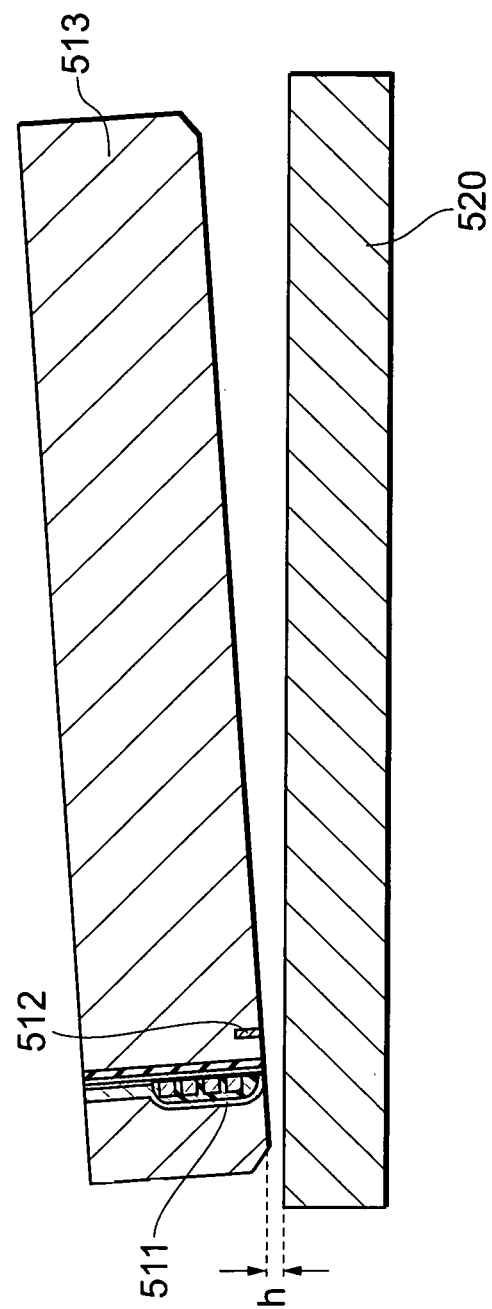

THIN-FILM MAGNETIC HEAD, METHOD OF MANUFACTURING THE SAME, HEAD GIMBAL ASSEMBLY, AND HARD DISK DRIVE

BACKGROUND

1. Field of the Invention

The present invention relates to a thin-film magnetic head which performs a magnetic recording action by a perpendicular recording scheme, a method of manufacturing the same, a head gimbal assembly, and a hard disk drive.

2. Related Background Art

In recent years, hard disk drives have remarkably been improving their areal recording density. The areal recording density of hard disks has recently reached and is about to exceed 160 to 200 GB/platter in particular. In keeping with this trend, thin-film magnetic heads have been required to improve their performances.

The thin-film magnetic heads can roughly be classified according to their recording schemes into those of longitudinal magnetic recording type and those of perpendicular magnetic recording type. The longitudinal magnetic recording scheme records data in a (longitudinal) direction within a recording surface of a hard disk (recording medium), while the perpendicular magnetic recording scheme records data such that the direction of recording magnetization formed in the hard disk is made perpendicular to the recording surface. The thin-film magnetic heads of perpendicular magnetic recording type have been considered more promising than those of longitudinal magnetic recording type, since they can realize a much higher recording density than that in the longitudinal magnetic recording scheme, while their recorded hard disks are less susceptible to heat fluctuation.

Conventional thin-film magnetic heads of perpendicular magnetic recording type are disclosed in U.S. Pat. Nos. 6,504,675, 4,656,546, and 4,672,493 and Japanese Patent Application Laid-Open No. 2004-94997, for example.

Meanwhile, a conventional magnetic head of perpendicular magnetic recording type (perpendicular magnetic recording head which will also be referred to as "PMR" in the following) has a magnetic pole layer and a thin-film coil. The magnetic pole layer generates a recording magnetic field for recording data onto a recording medium by the perpendicular magnetic recording scheme. The thin-film coil generates a magnetic field corresponding to the data to be recorded on the recording medium.

As such a PMR, one equipped with a write shield layer has conventionally been known as described in U.S. Pat. No. 4,656,546. The PMR equipped with the write shield layer has a structure shown in FIG. 39, for example. FIG. 39 is a sectional view showing the structure of a conventional PMR 500.

This PMR 500 has an insulating layer 501, a main magnetic pole layer 502, a medium-opposing surface (air bearing surface, which will also be referred to as "ABS") 503, and a gap layer 504. The PMR 500 also has a write shield layer 505, a thin-film coil 506, a photoresist 507, and a connecting part 508 connecting the main magnetic pole layer 502 and write shield layer 505 to each other.

The main magnetic pole layer 502 is formed on the insulating layer 501 and has a magnetic pole end part arranged on the ABS 503 side. The write shield layer 505 is magnetically connected to the main magnetic pole layer 502 at a position remote from the ABS 503, and opposes the main magnetic pole layer 502 while interposing the gap layer 504 therebetween on the ABS 503 side. The thin-film coil 506 is wound like a flat spiral about the connecting part 508, while their turns are insulated from each other by the photoresist 507.

The main magnetic pole layer 502 and write shield layer 505 are formed from a magnetic material, while the gap layer 504 is made of an insulating material such as alumina ($Al_2O_3$). The thin-film coil 506 is formed from a conductive material such as copper.

SUMMARY OF THE INVENTION

The conventional PMR causes a current to flow through the thin-film coil, so as to generate a magnetic field, thereby recording data onto the recording medium. In the case of the PMR 500, a current flows through the thin-film coil 506, so as to record data onto the recording medium.

However, the thin-film coil 506 generates heat when a current flows therethrough, whereby the heat is transmitted to the photoresist 507 thereabout. The photoresist 507 is formed from an organic material and thus has a coefficient of expansion greater than that of the thin-film coil 506. Therefore, the photoresist 507 is easier to expand when heated. When the photoresist 507 expands, the end part of the write shield layer 505 on the ABS 503 side is pushed out of the ABS 503, so as to protrude therefrom.

As shown in FIG. 40, on the other hand, a recording head 511 used when recording data onto a recording medium such as the PMR 500 and a reproducing head 512 used when reading data recorded on the recording medium are incorporated in a head slider 513. The head slider 513 is attached to an undepicted gimbal while being tilted with respect to the surface of a recording medium 520. The head slider 513 is slightly levitated (by a flying height h) from the surface of the recording medium 520 by an airflow flowing into the space between the ABS and the surface of the recording medium 520 from the end part on the air inlet side.

For improving the recording density and ameliorating the signal-to-noise ratio by enhancing the resolution of the recording head 511 and reproducing head 512, it is desirable to arrange the head slider 513 as close as possible to the surface of the recording medium 520, i.e., to minimize the flying height h.

When the end part on the ABS projects as mentioned above by expansion of the photoresist 507, the recording head 511 is likely to collide with the recording medium 520, thereby causing the hard disk drive to fail. In particular, the recording head 511 is positioned closer to the surface of the recording medium 520 than is the reproducing head 512 and thus is more likely to collide with the recording medium 520. Therefore, even when the resolution is desired to be enhanced, the head slider 513 cannot be arranged closer to the surface of the recording medium 520. Thus, it has been difficult for the conventional PMR to reduce the flying height h of the head slider 513. Therefore, it has been difficult for the prior art to enhance the resolution of the recording head 511 and reproducing head 512, so as to improve the signal-to-noise ratio.

For overcoming the problem mentioned above, it is an object of the present invention to make it possible to reduce the flying height of a head slider from a recording medium surface by restraining a write shield layer from projecting in a thin-film magnetic head performing a magnetic recording action by a perpendicular recording scheme, a method of manufacturing the same, a head gimbal assembly, and a hard disk drive.

For achieving the above-mentioned object, in one aspect, the present invention provides a thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate; wherein the thin-film coil has a plurality of turn parts arranged at respective positions having different distances from the medium-opposing surface; and wherein a non-expandable part made of an insulating material having a coefficient of thermal expansion smaller than that of a photosensitive resin is formed between the turn parts.

In this thin-film magnetic head, the non-expandable part is made of an insulating material having a coefficient of thermal expansion smaller than that of the photosensitive resin and thus does not expand even when the heat from the thin-film coil is applied thereto.

The thin-film magnetic head may further comprise an opposing insulating layer arranged closer to the medium-opposing surface than is the thin-film coil, while a non-expandable part may further be formed between the opposing insulating layer and the thin-film coil.

Forming such a non-expandable part can suppress the expansion of a portion near the medium-opposing surface.

The write shield layer may have a front shield part arranged closer to the medium-opposing surface than is the thin-film coil, while a non-expandable part may further be formed between the front shield part and the thin-film coil.

Forming such a non-expandable part can also suppress the expansion of a portion near the medium-opposing surface.

The write shield layer may further have a rear shield part arranged at a position distanced more from the medium-opposing surface than is the thin-film coil, while a non-expandable part may further be formed between the rear shield part and the thin-film coil. This can reliably suppress the projection on the medium-opposing surface side.

The write shield layer may have a front shield part arranged closer to the medium-opposing surface than is the thin-film coil, a rear shield part arranged at a position distanced more from the medium-opposing surface than is the thin-film coil, and a connecting shield part connecting the front and rear shield parts to each other, while non-expandable parts may further be formed between the front shield part and the thin-film coil and between the rear shield part and the thin-film coil, respectively. This can more reliably suppress the projection on the medium-opposing surface side.

The thin-film magnetic head may further comprise an interlayer insulating layer in contact with the thin-film coil and non-expandable part between the front and rear shield parts.

Preferably, the thin-film magnetic head further has a displacement suppression layer formed from a nonmagnetic material so as to cover the connecting shield part.

The displacement suppression layer restrains the connecting shield part from being displaced by the heat generated by the thin-film coil.

Preferably, the thin-film magnetic head further comprises a protective layer completely covering the displacement suppression layer. The protective layer restrains the displacement suppression layer from projecting from the medium-opposing surface.

The thin-film magnetic head may further comprise a routing shield part formed so as to be routed from the rear shield part to the medium-opposing surface side, while the interlayer insulating layer may be in contact with the routing shield part.

Any of the non-expandable parts may be constituted by SOG (Spin On Glass).

In another aspect, the present invention provides a method of manufacturing a thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate; the method comprising the following steps (1) to (3):

(1) forming the thin-film coil on a surface of a multilayer body and then applying a photosensitive resin to the surface of the multilayer body so as to cover the thin-film coil;

(2) polishing the surface of the multilayer body until the thin-film coil emerges and then filling a gap obtained by removing the photosensitive resin with an insulating filler made of an insulating material having a coefficient of thermal expansion smaller than that of the photosensitive resin, so as to form a non-expandable part; and (3) forming the main magnetic pole layer, gap layer, and write shield layer.

This manufacturing method secures a gap for forming a non-expandable part by using a photosensitive resin, and fills the gap with an insulating filler, so as to form the non-expandable part.

The manufacturing method may perform the step of forming a cover insulating film adapted to cover the surface of the multilayer body on the surface of the multilayer body after the step of applying the photosensitive resin to the surface of the multilayer body, and then polish the surface of the multilayer body until the thin-film coil emerges. This can form a non-expandable part between the cover insulating film and the thin-film coil.

The manufacturing method may apply the insulating filler to the surface of the multilayer body after yielding the gap by removing the photosensitive resin, so as to form the cover insulating film adapted to cover the surface of the multilayer body again, and then polish the surface of the multilayer body until the thin-film coil emerges, so as to form the non-expandable part by filling the gap with the insulating filler. This can form an insulating non-expandable part by applying the insulating filler.

The manufacturing method may form gaps between turn parts constituting the thin-film coil and between the turn part and the medium-opposing surface. This can form the non-expandable part closer to the medium-opposing surface than is the thin-film coil.

The manufacturing method may further comprise the step of forming a front shield part constituting the write shield layer for forming a front gap arranged closer to the medium-opposing surface than is the thin-film coil in the gaps.

This can form the front gap between the front shield part and the thin-film coil, and form the insulating non-expandable part there.

The manufacturing method may use SOG (Spin On Glass) as the insulating filler.

In still another aspect, the present invention provides a head gimbal assembly comprising a thin-film magnetic head formed on a support and a gimbal for securing the support; wherein the thin-film magnetic head is constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate; wherein the thin-film coil has a plurality of turn parts arranged at respective positions having different distances from the medium-opposing surface; and wherein a non-expandable part made of an insulating material having a coefficient of thermal expansion smaller than that of a photosensitive resin is formed between the turn parts.

In still another aspect, the present invention provides a hard disk drive comprising a head gimbal assembly having a thin-film magnetic head and a recording medium opposing the thin-film magnetic head; wherein the thin-film magnetic head is constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate; wherein the thin-film coil has a plurality of turn parts arranged at respective positions having different distances from the medium-opposing surface; and wherein a non-expandable part made of an insulating material having a coefficient of thermal expansion smaller than that of a photosensitive resin is formed between the turn parts.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 1A is a sectional view of the thin-film magnetic head in accordance with a first embodiment of the present invention taken along the line A-A of FIG. 1B, which is a direction intersecting its ABS, while FIG. 1B is a front view showing the ABS of the thin-film magnetic head;

FIGS. 6A and 6B are sectional views corresponding to FIGS. 1A and 1B, respectively, showing a step subsequent to that of FIG. 5;

FIGS. 10A and 10B are sectional views corresponding to FIGS. 1A and 1B, respectively, showing a step subsequent to that of FIG. 9;

FIGS. 12A and 12B are sectional views corresponding to FIGS. 1A and 1B, respectively, showing a step subsequent to that of FIG. 11;

FIGS. 13A and 13B are sectional views corresponding to FIGS. 1A and 1B, respectively, showing a step subsequent to that of FIG. 12;

FIGS. 17A and 17B are sectional views corresponding to FIGS. 1A and 1B, respectively, showing a step subsequent to that of FIG. 16;

FIG. 20A is a plan view showing a cavity, while

FIG. 21A is a sectional view of the thin-film magnetic head in accordance with a second embodiment of the present invention taken along the line A-A of FIG. 21B, which is a direction intersecting its ABS, while FIG. 21B is a front view showing the ABS of the thin-film magnetic head;

FIGS. 25A and 25B are sectional views corresponding to FIGS. 21A and 21B, respectively, showing a step subsequent to that of FIG. 24;

FIGS. 26A and 26B are sectional views corresponding to FIGS. 21A and 21B, respectively, showing a step subsequent to that of FIG. 25;

FIGS. 29A and 29B are sectional views corresponding to FIGS. 21A and 21B, respectively, showing a step subsequent to that of FIG. 28;

FIGS. 34A and 34B are sectional views corresponding to FIGS. 21A and 21B, respectively, showing a step subsequent to that of FIG. 33;

FIG. 40 is a sectional view showing a slider incorporating a conventional thin-film magnetic head therein and an example of recording media.

DESCRIPTION OF THE PREFERRED EMBODIMENTS

In the following, embodiments of the present invention will be explained with reference to the drawings. The same constituents will be referred to with the same numerals or letters, while omitting their overlapping explanations.

First Embodiment

Structure of Thin-Film Magnetic Head

Figures 1A, 1B:
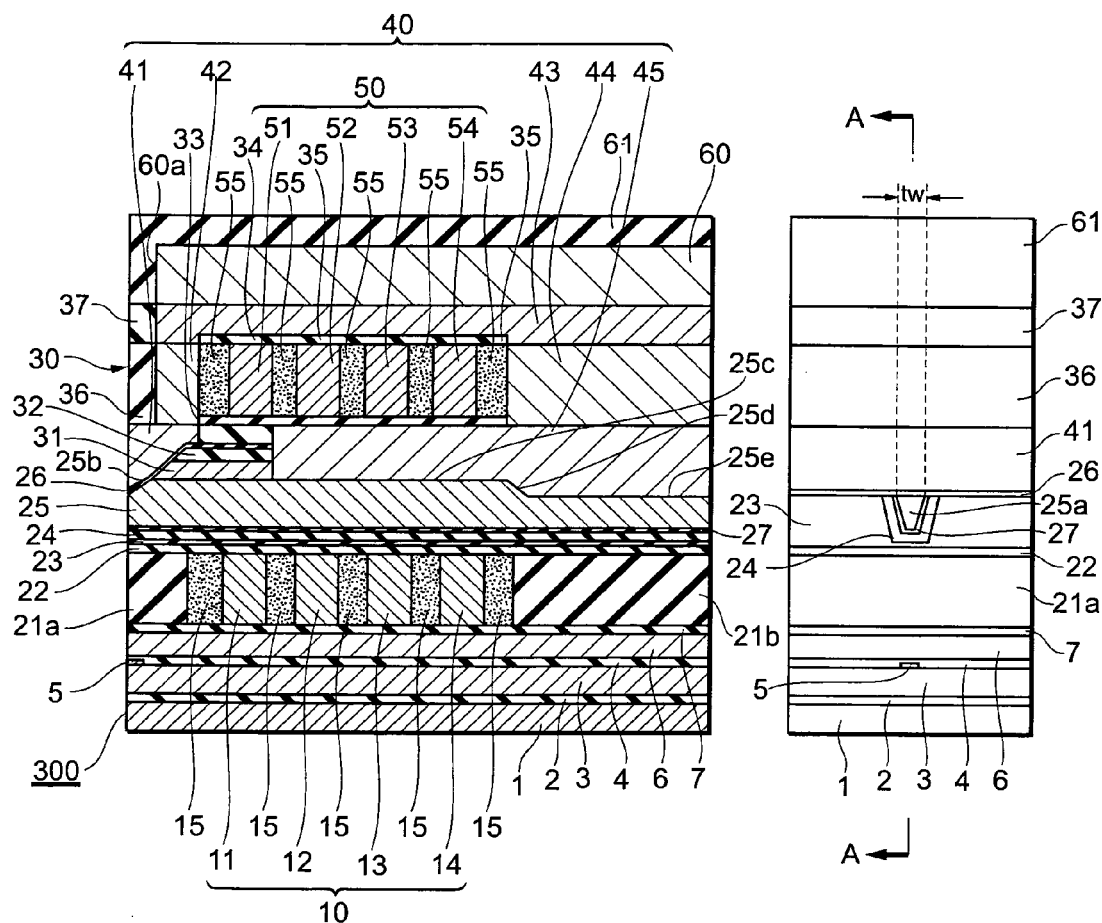

To begin with, the structure of a thin-film magnetic head of perpendicular magnetic recording type in accordance with the first embodiment will be explained with reference to FIGS. 1A and 1B. Here, FIG. 1A is a sectional view of the thin-film magnetic head 300 in accordance with the first embodiment of the present invention taken along the line A-A of FIG. 1B, which is a direction intersecting its air bearing surface (which will hereinafter be referred to as ABS), while FIG. 1B is a front view showing the ABS 30 of the thin-film magnetic head 300.

The thin-film magnetic head 300 comprises a substrate 1 and reproducing and recording heads laminated on the substrate 1, while having the ABS 30 as a medium-opposing surface opposing a recording medium. The following will explain structures of main parts of the thin-film magnetic head 300, while structures of parts other than the main parts will later be explained in manufacturing steps.

The reproducing head has an MR device 5, arranged near the ABS 30, for detecting a magnetic signal. The reproducing head has an insulating layer 2 formed on the substrate 1, a lower shield layer 3 made of a magnetic material, and a shield gap film 4 shielding the MR device 5. The reproducing head further has an upper shield layer 6 made of a magnetic material formed on the shield gap film 4, and an insulating layer 7 formed on the upper shield layer 6.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The recording head has a lower thin-film coil 10, an upper thin-film coil 50, lower non-expandable parts 15, upper non-expandable parts 55, a main magnetic pole layer 25, a gap layer 26, a write shield layer 40, a displacement suppression layer 60, and a protective layer 61 which are laminated on the substrate 1.

The recording head has a lower opposing insulating layer 21a and an upper opposing insulating layer 36 which are arranged (at positions) closer to the ABS 30 than is the lower thin-film coil 10, and a rear insulating layer 21b placed at a position distanced more from the ABS 30 than is the lower thin-film coil 10.

The recording head further has a first interlayer insulating layer 34 and a second interlayer insulating layer 35.

The lower thin-film coil 10 has four turn parts 11, 12, 13, 14 between the lower opposing insulating layer 21a and rear insulating layer 21b. The lower thin-film coil 10 is connected to the upper thin-film coil 50 through an undepicted part, so as to form a series of coils, while being wound about the main magnetic pole layer 25. The lower thin-film coil 10 and upper thin-film coil 50 generate a magnetic field corresponding to data to be recorded on a recording medium.

The upper thin-film coil 50 has four turn parts 51, 52, 53, 54 between a front shield part 42 and a rear shield part 44 which will be explained later. The upper thin-film coil 50 is connected to the lower thin-film coil 10 through an undepicted part, so as to form a series of coils.

The lower non-expandable parts 15 are formed so as to be embedded between the turn parts 11, 12, 13, 14 of the lower thin-film coil 10, and are in direct contact with the turn parts 11, 12, 13, 14. The lower non-expandable part 15 is also formed so as to be embedded between the turn part 11 and lower opposing insulating layer 21a, and is in direct contact with both of the turn part 11 and lower opposing insulating layer 21a. The lower non-expandable part 15 is further formed so as to be embedded between the turn part 14 and rear opposing insulating layer 21b, and is in direct contact with both of the turn part 14 and rear insulating layer 21b. The lower non-expandable parts 15, which are formed from an insulating material having a coefficient of thermal expansion smaller than that of a photoresist, are constituted by SOG (Spin On Glass) in this embodiment. Therefore, the lower non-expandable parts 15 are excellent in diffusing the heat generated by the lower thin-film coil 10 to the outside without holding it inside.

The upper non-expandable parts 55 are formed so as to be embedded between the turn parts 51, 52, 53, 54 of the upper thin-film coil 50, and are in direct contact with the turn parts 51, 52, 53, 54. The upper non-expandable part 55 is also formed so as to be embedded between the turn part 51 and the front shield part 42 that will be explained later, and is in direct contact with both of the turn part 51 and front shield part 42. The upper non-expandable part 55 is further formed so as to be embedded between the turn part 54 and rear shield part 44, and is in direct contact with both of the turn part 54 and rear shield part 44. The upper non-expandable parts 55 are constituted by SOG as with the lower non-expandable parts 15. The upper non-expandable parts 55 are excellent in diffusing the heat generated by the upper thin-film coil 50 to the outside without holding it inside.

As shown in FIG. 1B, the main magnetic pole layer 25 has a magnetic pole end face 25a on the ABS 30 side. The magnetic pole end face 25a has a bevel form which is wider on the upper thin-film coil 50 side than on the lower thin-film coil 10 side and gradually decreases its width toward the lower thin-film coil 10. The width of the magnetic pole end face 25a on the upper thin-film coil 50 side defines the track width tw. The track width tw is about 0.05 to 0.2 µm, for example.

The main magnetic pole layer 25 includes a track width determining part having the magnetic pole end face 25a, and a wider part which is arranged at a position distanced more from the ABS 30 than is the track width determining part and has a width greater than that of the track width determining part. (The track width determining part and the wider part are not depicted.) The track width determining part has a fixed width regardless of the distance from the ABS 30. The wider part has the same width as that of the track width determining part at the boundary with the track width determining part, gradually increases the width as it is distanced more from the ABS 30, and then attains a fixed width. In this embodiment, a part extending from the magnetic pole end part 25a until the width begins to increase is defined as the track width determining part. The length of the track width determining part from the ABS 30 is referred to as neck height. The neck height is about 0.05 to 0.3 µm, for example.

The distance between the edge part located closest to the ABS in the lower face of a nonmagnetic layer 31 which will be explained later and the ABS 30 equals a throat height. The throat height is about 0.08 to 0.12 µm, for example.

The main magnetic pole layer 25 has a tilted surface 25b (see FIG. 11A for details), an upper end face 25c, a slope 25d, and an upper end face 25e. The tilted surface 25b is formed as an upslope whose distance from the ABS 30 gradually increases as it is farther from the ABS 30. The upper end face 25c is formed flat along a direction perpendicular to the ABS 30 at a position distanced more from the ABS 30 than is the tilted surface 25b. The slope 25d is formed so as to descend slightly from the upper end face 25c. The upper end face 25e is formed flat along a direction perpendicular to the ABS 30 at a position distanced more from the ABS 30 than is the slope 25d.

In the main magnetic pole layer 25, nonmagnetic layers 31, 32 are laminated on the upper end face 25c between an opposing shield part 41 and a routing shield part 45 which will be explained later.

The main magnetic pole layer 25 is further laminated with a coating film 24 and a polishing stop layer 27. The main magnetic pole layer 25 transmits therethrough a magnetic flux corresponding to a magnetic field caused by the lower thin-film coil 10 and upper thin-film coil 50, and generates a recording magnetic field for recording data onto a recording medium by a perpendicular magnetic recording scheme.

The gap layer 26 is formed along the tilted surface 25b of the main magnetic pole layer 25 between the opposing shield part 41 and the main magnetic pole layer 25 and nonmagnetic layers 31, 32. The gap layer 26 is made of an insulating material such as alumina ($Al_2O_3$) and formed so as to cover the tilted surface 25b and nonmagnetic layers 31, 32.

The write shield layer 40 has the opposing shield part 41, the front shield part 42, a connecting shield part 43, the rear shield part 44, and the routing shield part 45.

The opposing shield part 41 has an end face exposed at the ABS 30, and is formed such as to oppose the main magnetic pole layer 25 and nonmagnetic layers 31, 32 successively from the ABS 30 side through the gap layer 26. The opposing shield part 41 has a flat upper face, to which the front shield part 42 is connected.

The front shield part 42 is arranged closer to the ABS 30 than is the upper thin-film coil 50. The front shield part 42 is arranged between and in direct contact with the upper opposing insulating layer 36 and upper non-expandable part 55.

The front shield part 42 is connected to the opposing shield part 41 and connecting shield part 43.

The connecting shield part 43 is formed such as to straddle the upper non-expandable parts 55 and the upper thin-film coil 50 and connects the front shield part 42 and rear shield part 44 to each other.

The rear shield part 44 is arranged at a position distanced more from the ABS 30 than are the upper non-expandable parts 55 and upper thin-film coil 50. The rear shield part 44 is in direct contact with the upper non-expandable part 55. The rear shield part 44 is connected to the connecting shield part 43 and routing shield part 45.

The routing shield part 45 is formed so as to be routed from the rear shield part 44 to the ABS 30 side by bypassing the turn parts 52, 53, 54 and upper non-expandable parts 55. The part of the routing shield part 45 routed from the rear shield part 44 to the ABS 30 side is in contact with the first interlayer insulating layer 34. The routing shield part 45 is connected to a part of the upper end face 25c, the slope 25d, and the upper end face 25e in the main magnetic pole layer 25. The rear shield part 44 is connected to the routing shield part 45 at a position distanced more from the ABS 30 than are the upper thin-film coil 50 and upper non-expandable parts 55.

Both of the first and second interlayer insulating layers 34, 35 are in contact with the upper thin-film coil 50 and upper non-expandable parts 55 between the front shield part 42 and rear shield part 44. The first interlayer insulating layer 34 is arranged between the lower and upper thin-film coils 10, 50, while the second interlayer insulating layer 35 is arranged on the outside of the upper thin-film coil 50.

On the other hand, the displacement suppression layer 60 is formed such as to cover the connecting shield part 43 and has an end face 60a along the ABS 30. The end face 60a is arranged at a position separated from the ABS 30.

The displacement suppression layer 60 is formed from a nonmagnetic material having a low coefficient of linear thermal expansion. For example, the displacement suppression layer 60 is preferably made of an inorganic or metal material, examples of which include SiC, AlN, $Si_3N_4$, and W (tungsten). It will be preferred in particular to use a nonmagnetic material having a high hardness for the displacement suppression layer 60. For example, the displacement suppression layer 60 is preferably made of SiC, which has a Vickers hardness higher than that of alumina. The protective layer 61 is formed so as to cover the displacement suppression layer 60 completely.

As in the foregoing, the thin-film magnetic head 300 has the lower non-expandable parts 15 and upper non-expandable parts 55. Each of the lower and upper non-expandable parts 15, 55 is constituted by SOG. Therefore, the lower and upper non-expandable parts 15, 55 have a coefficient of thermal expansion smaller than that of the photoresist, while containing a number of fine particles, and thus are excellent in diffusing the heat transmitted thereto from the outside if any, without holding it inside. The lower and upper non-expandable parts 15, 55 are formed so as to be embedded between their corresponding turn parts 11 to 14, 51 to 54 and thus are widely in contact with side face parts thereof. This allows the lower and upper non-expandable parts 15, 55 to widely receive the heat generated by their corresponding turn parts.

The lower and upper thin-film coils 10, 50 generate heat when a current flows therethrough. Since the lower and upper thin-film coils 10, 50 are in direct contact with the lower and upper non-expandable parts 15, 55, the heat generated by the lower and upper thin-film coils 10, 50 is directly transmitted therefrom to the lower and upper non-expandable parts 15, 55, respectively. Since the lower and upper thin-film coils 10, 50 are in contact with both side faces of their corresponding turn parts 11 to 14, 51 to 54, the heat generated by the lower and upper thin-film coils 10, 50 is more effectively transmitted to the lower and upper non-expandable parts 15, 55.

However, the lower and upper non-expandable parts 15, 55 are formed from an insulating material having a low coefficient of thermal expansion, and thus hardly expand even when heat is applied thereto. Therefore, even when a current is caused to flow through the lower and upper thin-film coils 10, 50, so as to heat them, the lower opposing insulating layer 21a arranged closer to the ABS 30 than are the lower non-expandable parts 15 and the front shield part 42 arranged closer to the ABS 30 than are the upper non-expandable parts 55 are kept from being pushed out toward the ABS 30.

Therefore, the thin-film magnetic head 300 can restrain the write shield layer 40 from projecting as the lower and upper thin-film coils 10, 50 generate heat. As a consequence, the thin-film magnetic head 300 is very unlikely to be damaged by the projection of the recording head and thus can approach recording media.

While the thin-film magnetic head 300 is incorporated in an undepicted slider, the flying height of the slider from the recording medium surface can be reduced. Therefore, the thin-film magnetic head 300 can enhance the resolution of recording and reproducing heads, thereby improving their signal-to-noise ratio. A structure such as that of the thin-film magnetic head 300 can also increase the yield of PMR having a high recording density.

In the thin-film magnetic head 300 in particular, the upper non-expandable parts 55 are formed not only between the turn parts 51 to 54, but also between the turn part 51 and front shield part 42. Forming the upper non-expandable parts 55 between the turn parts 51 to 54 alone can also restrain the front shield part 42 from projecting upon heating of the upper thin-film coil 50. However, the photoresist remaining embedded on the side face of the turn part 51 on the ABS 30 side, if any, may be expanded by the heat from the turn part 51, so as to push out the front shield part 42.

Therefore, by also forming the upper non-expandable part 55 between the turn part 51 and front shield part 42, the thin-film magnetic head 300 effectively diffuses the heat generated from the side face of the turn part 51 on the ABS 30 side, so as to restrain the front shield part 42 from projecting. This can further restrain the write shield layer 40 from projecting.

In the thin-film magnetic head 300, the upper non-expandable part 55 is further formed between the turn part 54 and rear shield part 44. This effectively diffuses the heat generated from the side face of the turn part 54 on the side remote from the ABS 30, thereby further restraining the write shield layer 40 from projecting.

Furthermore, in the thin-film magnetic head 300, the lower non-expandable parts 15 are formed between the turn part 11 and lower opposing insulating layer 21a and between the turn part 14 and rear insulating layer 21b. This effectively diffuses the heat generated from the side face of the turn part 11 on the ABS 30 side and the heat generated from the side face of the turn part 14 on the side remote from the ABS 30, thereby further restraining the write shield layer 40 from projecting.

The thin-film magnetic head 300 is formed with the displacement suppression layer 60 in addition to the foregoing lower and upper non-expandable parts 15, 55. Therefore, the heat generated by the lower and upper thin-film coils 10, 50 can be restrained from displacing the connecting shield part 43. This can suppress the displacement of the opposing shield part 41 and front shield part 42 caused by the displacement of the connecting shield part 43, whereby the opposing shield part 41 can further be restrained from projecting from the ABS 30.

Suppose that the displacement suppression layer 60 constituted by a nonmagnetic material such as SiC which has a hardness higher than that of alumina is exposed on the ABS 30. This may incur a fear of the displacement suppression layer 60 projecting from the ABS 30 when the multilayer body is polished for forming the ABS 30. This is because the nonmagnetic material having a hardness higher than that of alumina is harder to polish than alumina. Therefore, when forming the displacement suppression layer 60, it will be preferred if the displacement suppression layer 60 is formed at a position separated from the ABS 30, while the protective layer 61 is formed such as to keep the displacement suppression layer 60 from being exposed on the ABS 30.

When the nonmagnetic material constituting the displacement suppression layer 60 has a high coefficient of thermal conductivity, the heat generated by the lower and upper thin-film coils 10, 50 can be diffused by the displacement suppression layer 60. Therefore, the displacement suppression layer 60 is preferably made of a nonmagnetic material having a high coefficient of thermal conductivity.

Method of Manufacturing Thin-Film Magnetic Head

Figures 2A, 2B:
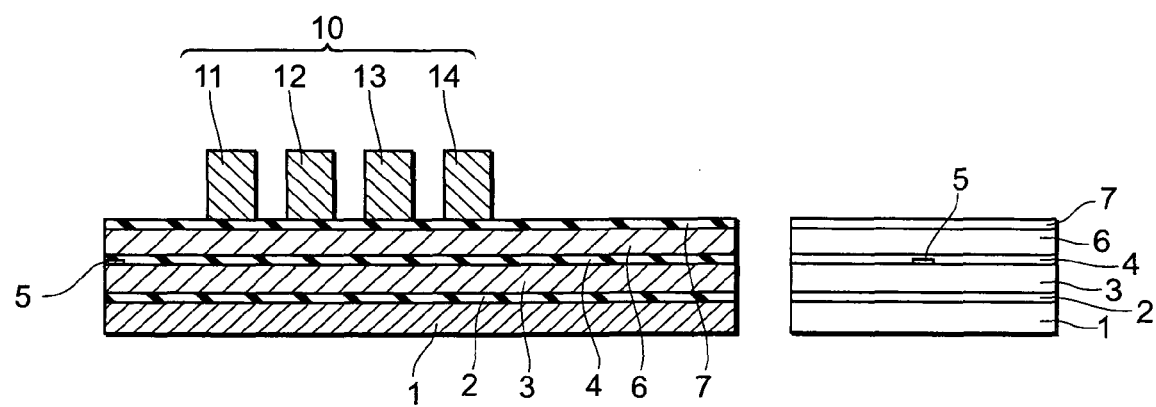
FIGS. 2A and 2B are sectional views corresponding to FIGS. 1A and 1B, respectively, in a step of manufacturing the thin-film magnetic head in accordance with the first embodiment.

A method of manufacturing the thin-film magnetic head 300 in accordance with the first embodiment having the structure mentioned above will now be explained with reference to FIGS. 2A, 2B to 20A, and 20B together with FIGS. 1A and 2B mentioned above.

FIGS. 2A to 19A are sectional views corresponding to FIG. 1A in respective steps of manufacturing the thin-film magnetic head 300, while FIGS. 2B to 19B are sectional views similarly corresponding to FIG. 1B.

First, the substrate 1 made of a ceramic material such as aluminum oxide-titanium carbide ($Al_2O_3.TiC$) is prepared. Subsequently, as shown in FIGS. 2A and 2B, the insulating layer 2 made of an insulating material such as alumina ($Al_2O_3$) and the lower shield layer 3 made of a magnetic material are successively laminated on the substrate 1. Then, the shield gap film 4 is formed by an insulating material such as to shield the MR device 5. Here, an undepicted lead connected to the MR device 5 is formed, and the MR device 5 and lead are covered with the shield gap film 4. Thereafter, using a magnetic material, the upper shield layer 6 is formed on the shield gap film 4.

Next, the insulating layer 7 for separating the upper shield layer 6 and a recording head to be formed later from each other is formed by an insulating material such as alumina ($Al_2O_3$). The foregoing steps yield a multilayer body for forming the recording head. Thereafter, the lower thin-film coil 10 in the thin-film coils is formed by frame plating.

Figures 3A, 3B:
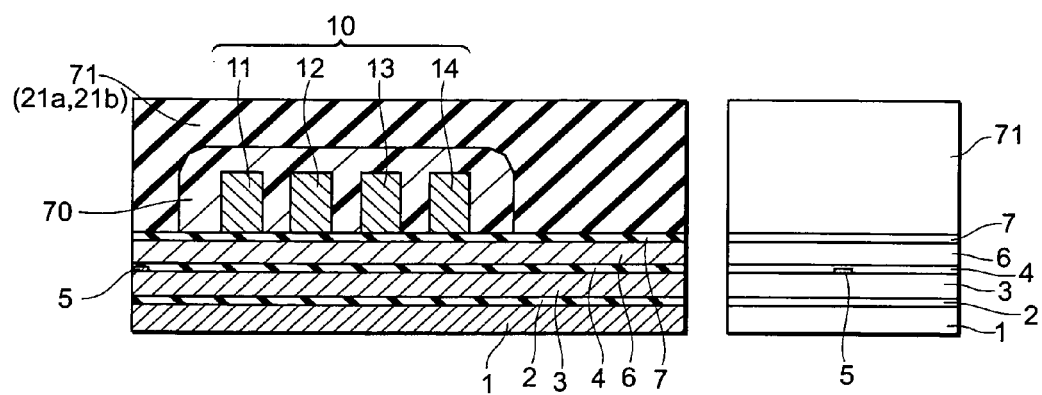
FIGS. 3A and 3B are sectional views corresponding to FIGS. 1A and 1B, respectively, showing a step subsequent to that of FIG. 2.

Then, a photoresist is applied to the surface of the multilayer body such as to cover the lower thin-film coil 10. Applying the photoresist forms a photoresist layer 70 so as to cover spaces between the turn parts 11, 12, 13, 14, side face portions of the turn parts 11, 14, and surfaces of the turn parts 11, 12, 13, 14 in the lower thin-film coil 10 as shown in FIGS. 3A and 3B.

Figures 4A, 4B:
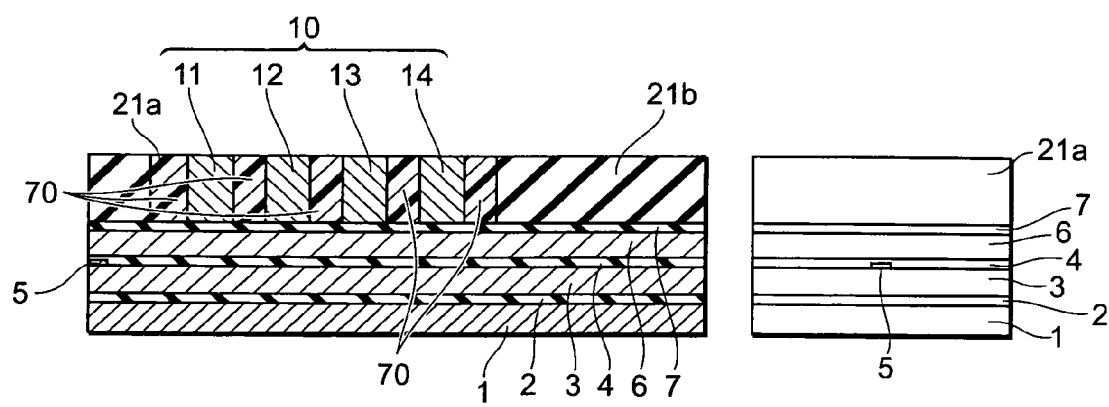
FIGS. 4A and 4B are sectional views corresponding to FIGS. 1A and 1B, respectively, showing a step subsequent to that of FIG. 3.

Next, a first cover insulating film 71 which can cover the surface of the multilayer body is formed by an insulating material such as alumina ($Al_2O_3$). Subsequently, the surface of the multilayer body is polished by chemical mechanical polishing (hereinafter referred to as "CMP"), for example, until the lower thin-film coil 10 emerges, so as to be made flat. This yields a state where the photoresist layer 70 remains between the turn parts 11, 12, 13, 14 as shown in FIGS. 4A and 4B. The part of the first cover insulating film 71 located closer to the ABS 30 than is the lower thin-film coil 10 forms the lower opposing insulating layer 21a, while the part separated more from the ABS 30 than is the lower thin-film coil 10 forms the rear insulating layer 21b. The photoresist layer 70 also remains between the lower opposing insulating layer 21a and turn part 11 and between the rear insulating layer 21b and turn part 14.

Figures 5A, 5B:
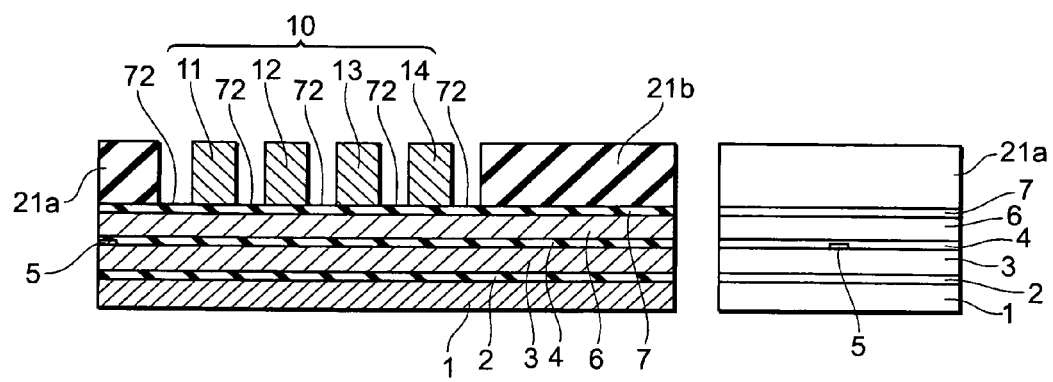
FIGS. 5A and 5B are sectional views corresponding to FIGS. 1A and 1B, respectively, showing a step subsequent to that of FIG. 4.

Next, the photoresist layer 70 remaining on the surface of the multilayer body is removed. This forms groove-like gaps 72 between the turn parts 11, 12, 13, 14 as shown in FIGS. 5A and 5B. Here, the gaps 72 are also obtained between the lower opposing insulating layer 21a and turn part 11 and between the rear insulating layer 21b and turn part 14. The gaps 72 are provided for forming the above-mentioned lower non-expandable parts 15, respectively. The gaps 72 are delimited by the turn parts 11, 12, 13, 14, lower opposing insulating layer 21a, and rear insulating layer 21b, so as to be defined in terms of position, form, and size.

Subsequently, as shown in FIGS. 6A and 6B, SOG (Spin On Glass) is applied as an insulating filler to the surface of the multilayer body, so as to form an SOG film 73 (having a thickness of about 2000 to 5000 Å). Further, a second cover insulating film 74 (having a thickness of about 1 to 2 μm) which can cover the surface of the multilayer body is formed by an insulating material such as alumina ($Al_2O_3$). Thereafter, the surface of the multilayer body is polished by CMP, for example, until the lower thin-film coil 10 emerges, so as to be made flat.

Figures 7A, 7B:
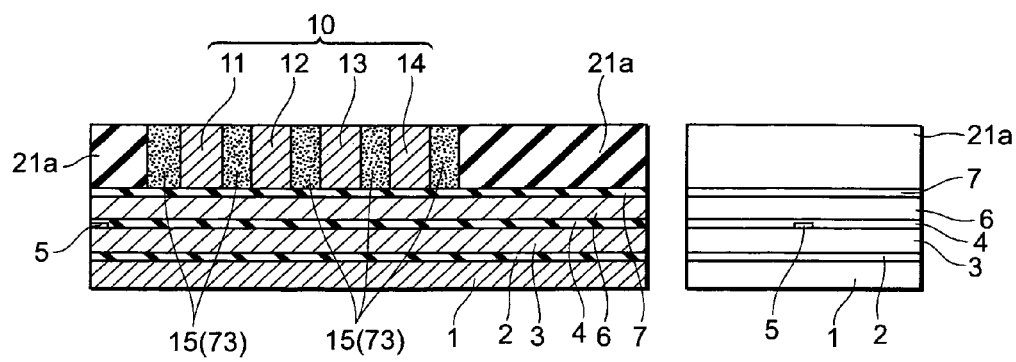
FIGS. 7A and 7B are sectional views corresponding to FIGS. 1A and 1B, respectively, showing a step subsequent to that of FIG. 6.

This can fill the interstices between the turn parts 11, 12, 13, 14, i.e., the gaps 72, with the SOG film 73 as shown in FIGS. 7A and 7B. This can also fill the gap 72 between the lower opposing insulating layer 21a and turn part 11 and the gap 72 between the rear insulating layer 21b and turn part 14 with the SOG film 73. Thus interposed SOG film 73 can form the above-mentioned lower non-expandable parts 15.

Figure 8A:
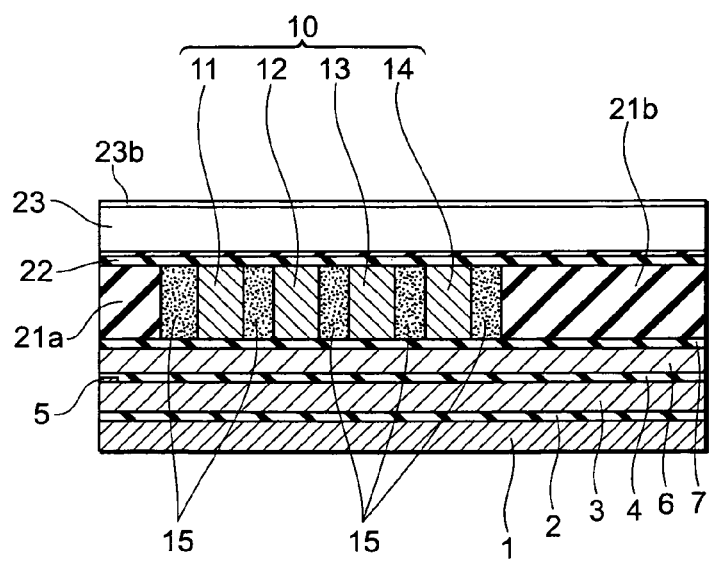
FIGS. 8A and 8B are sectional views corresponding to FIGS. 1A and 1B, respectively, showing a step subsequent to that of FIG. 7.
Figure 8B:
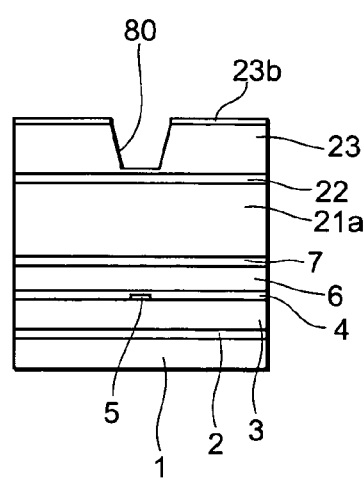

Subsequently, as shown in FIGS. 8A and 8B, an intermediate insulating layer 22 is formed on the surface of the multilayer body by an insulating material such as alumina ($Al_2O_3$).

Further, a base insulating layer 23 is formed on the surface of the multilayer body by an insulating material such as alumina ($Al_2O_3$). Subsequently, a nonmagnetic metal layer 23b made of a nonmagnetic metal material (e.g., Ru) is formed on the base insulating layer 23, for example. Then, after applying a photoresist to the surface of the multilayer body, patterning with a predetermined photomask is performed, so as to form a resist pattern by which the surface of the multilayer body is exposed as a form corresponding to a cavity 80 which will be explained later.

Figure 20A:
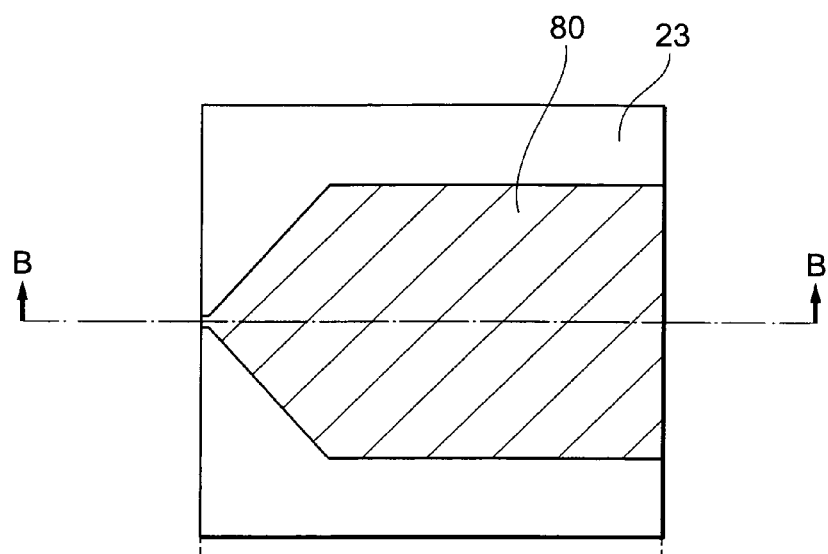
Figure 20B:
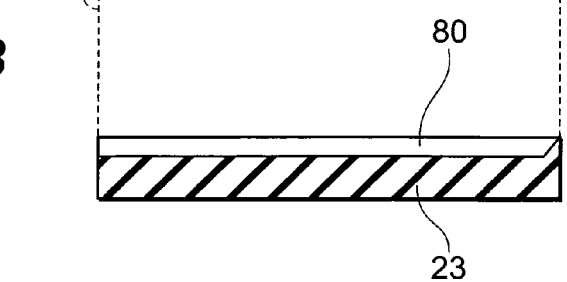
FIG. 20B is a sectional view taken along the line B-B of FIG. 20A.

Subsequently, using the resist pattern as a mask, reactive ion etching (hereinafter referred to as "RIE") is performed, so as to remove the part uncoated with the resist pattern in the surface of the multilayer body. This forms the cavity 80 in the base insulating layer 23 as shown in FIGS. 8A and 8B. For forming the main magnetic pole layer 25 with designed size and form, the cavity 80 is made by depressing a part of the base insulating layer 23 into a form corresponding to the outer form of the main magnetic pole layer 25 as shown in FIGS. 20A and 20B.

Figures 9A, 9B:
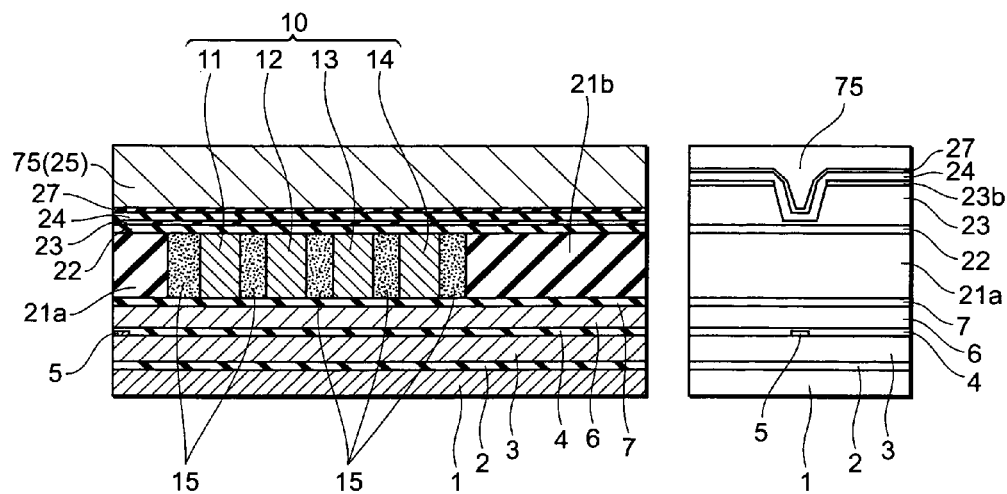
FIGS. 9A and 9B are sectional views corresponding to FIGS. 1A and 1B, respectively, showing a step subsequent to that of FIG. 8.

Next, as shown in FIGS. 9A and 9B, the coating film 24 made of alumina ($Al_2O_3$), Ta, W, TiN, or the like is formed on the whole surface of the multilayer body by CVD (Chemical Vapor Deposition) or sputtering in order to adjust the track width. Thereafter, the polishing stop layer 27 to become a stopper for CMP is formed by a thickness of about 400 to 600 Å so as to cover the cavity 80. The polishing stop layer 27 can be formed by sputtering or CVD with a nonmagnetic conductive material. For forming the polishing stop layer 27 by CVD, an atomic layer method is preferably employed. In this case, Ta or Ru is preferably used as a material for the polishing stop layer 27. The polishing stop layer 27 made by the atomic layer method has an excellent step coverage and thus can be formed uniformly within the cavity 80. This can accurately control the track width. When forming the polishing stop layer 27 by the atomic layer method, the coating film 24 may be omitted.

Thereafter, a magnetic layer 75 having a thickness of about 0.5 to 0.8 μm is formed on the whole surface of the multilayer body by sputtering with a magnetic material such as CoNiFe, CoFe, or NiFe. This magnetic layer 75 will later form the main magnetic pole layer 25. The foregoing steps place the multilayer body into the state shown in FIGS. 9A and 9B.

Subsequently, the whole surface of the multilayer body is polished by CMP, so as to become flat. Here, the polishing stop layer 27 functions as a stopper for CMP, whereby the CMP stops at the time when the polishing stop layer 27 is exposed.

Thereafter, as shown in FIGS. 10A and 10B, a nonmagnetic layer 76 (having a thickness of about 1000 Å) is formed on the whole surface of the multilayer body by sputtering with a metal material such as Ru, NiCr, or NiCu. The nonmagnetic layer 76 will partly be etched away later, so as to become the above-mentioned nonmagnetic layer 31. Further, using an inorganic insulating material such as alumina ($Al_2O_3$) or silicon oxide, a nonmagnetic layer 77 (having a thickness of about 2000 Å) is formed on the whole surface of the multilayer body. The nonmagnetic layer 77 will partly be etched away later, so as to become the above-mentioned nonmagnetic layer 32.

Subsequently, after applying a photoresist to the whole surface of the multilayer body, patterning with a predetermined photomask is performed, so as to form a resist pattern 78. Then, using the resist pattern 78 as a mask, etching such as RIE, for example, is performed, so as to remove a part of the nonmagnetic layer 77. The etching in this case is performed such as to stop at the time when the bottom part of a groove formed by etching reaches the upper face of the nonmagnetic layer 76. To this aim, a material yielding an etching rate lower than that of the nonmagnetic layer 77 is used for the nonmagnetic layer 76.

Figure 11A:
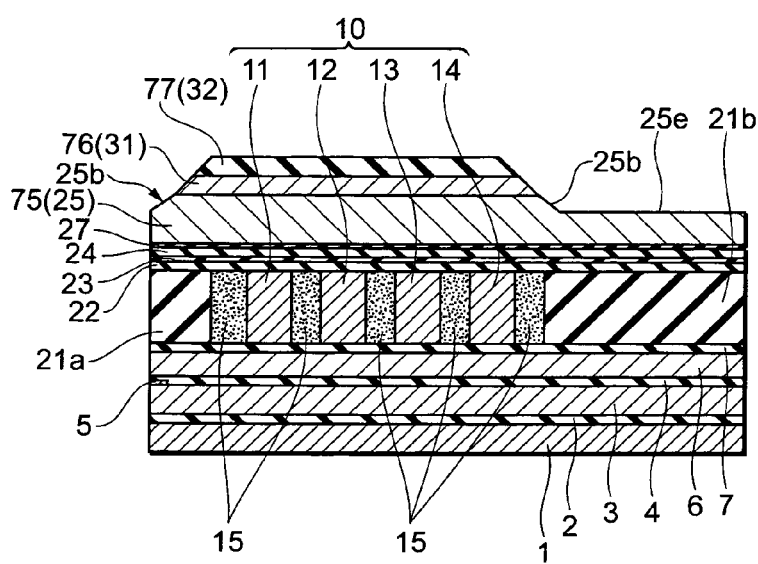
FIGS. 11A and 11B are sectional views corresponding to FIGS. 1A and 1B, respectively, showing a step subsequent to that of FIG. 10.
Figure 11B:
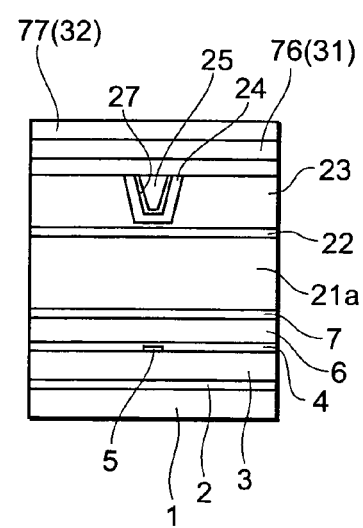

Next, as shown in FIGS. 11A and 11B, the resist pattern 78 is removed. Then, using the remaining nonmagnetic layer 77 as a mask, a part of the nonmagnetic layer 76 is etched away by IBE, for example. Further, using the remaining nonmagnetic layer 76 as a mask, a part of the nonmagnetic layer 75 is etched away by IBE, for example. This step forms the tilted surface 25b on the ABS side of the magnetic layer 75. The slope 25d and upper end face 25e are also formed at positions distanced from the ABS in the magnetic layer 75.

Subsequently, as shown in FIGS. 12A and 12B, the gap layer 26 is formed on the whole surface of the multilayer body by sputtering or CVD with an insulating material such as alumina ($Al_2O_3$) or a nonmagnetic conductive material such as Ru, NiCu, or Ta.

Further, an undepicted stopper film is formed by sputtering, for example, and a nonmagnetic film is formed thereon. Subsequently, an undepicted photoresist is applied to the whole surface of the multilayer body. Then, patterning with a predetermined photomask is performed, so as to form an undepicted resist pattern. Using this resist pattern as a mask, the nonmagnetic film is etched by RIE, for example. The etching is performed such as to stop when the bottom part of a groove formed by etching reaches the upper face of the stopper film. Then, after removing the resist pattern that is not depicted, the remaining film is used as a mask for partly etching the gap layer 26 and nonmagnetic layers 76, 77 away by RIE or the like. Here, the gap layer 26 and nonmagnetic layers 76, 77 are partly removed, so as to secure a space for forming the above-mentioned routing shield part 45.

Thereafter, a magnetic layer having a thickness of about 0.5 to 1.0 μm is formed on the whole surface of the multilayer body by plating with a magnetic material such as CoNiFe, CoFe, CoFeN, or NiFe. This magnetic layer will later become the opposing shield part 41 and routing shield part 45. Subsequently, an insulating layer is formed on the whole surface of the multilayer body by an insulating material such as alumina ($Al_2O_3$). Further, the whole surface of the multilayer body is polished by CMP, so as to become flat. This forms the opposing shield part 41, routing shield part 45, and insulating layer 33 as shown in FIGS. 12A and 12B.

Next, an insulating layer is formed on the whole surface of the multilayer body by an insulating material such as alumina ($Al_2O_3$). This insulating layer will later become the first interlayer insulating layer 34. Then, after applying a photoresist to the whole surface of the multilayer body, patterning with a predetermined photomask is performed, so as to form a resist pattern (not depicted). Using this resist pattern as a mask, the insulating layer is etched away by RIE, for example, except for parts for forming the upper thin-film coil 50 and upper non-expandable parts 55, so as to form the first interlayer insulating layer 34 as shown in FIGS. 13A and 13B.

Subsequently, the upper thin-film coil 50 in the thin-film coils is formed on the first interlayer insulating layer 34 by frame plating. Then, by frame plating, the front shield part 42 and the rear shield part 44, each having a thickness of about 0.4 to 0.6 μm, are formed closer to and farther from the ABS than is the upper thin-film coil 50, respectively. The upper thin-film coil 50 and the front and rear shield parts 42, 44 may be formed in reverse order as well.

Figures 14A, 14B:
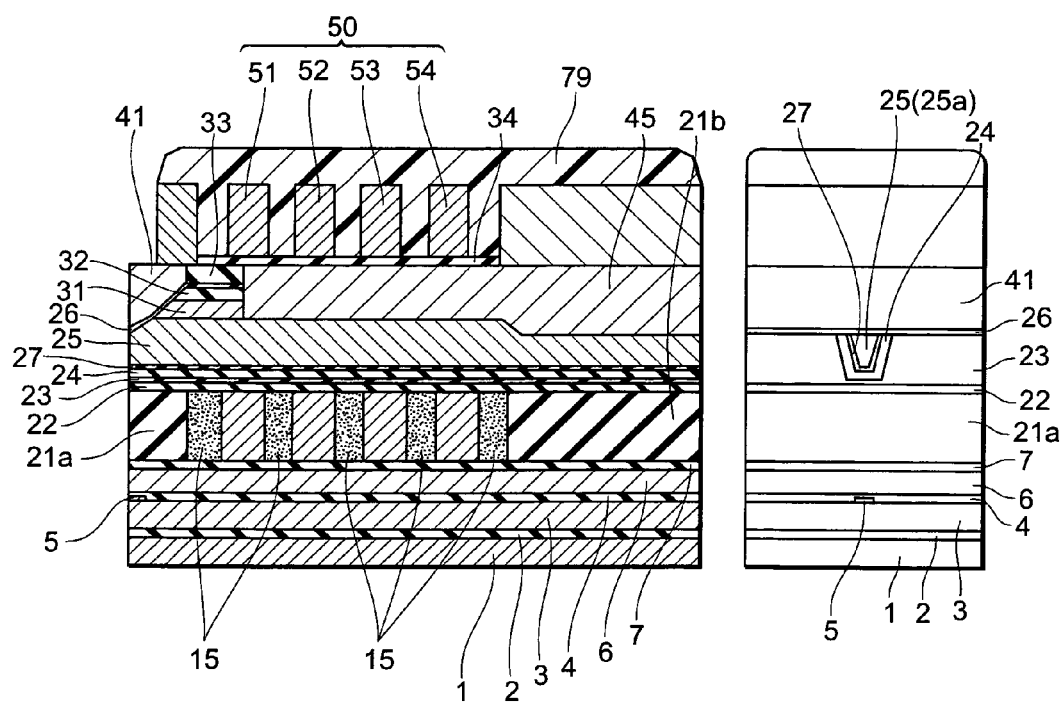
FIGS. 14A and 14B are sectional views corresponding to FIGS. 1A and 1B, respectively, showing a step subsequent to that of FIG. 13.

Thereafter, a photoresist is applied to the surface of the multilayer body so as to cover the upper thin-film coil 50 and front and rear shield parts 42, 44, thereby forming a photoresist layer 79 as shown in FIGS. 14A and 14B.

Figure 15A:
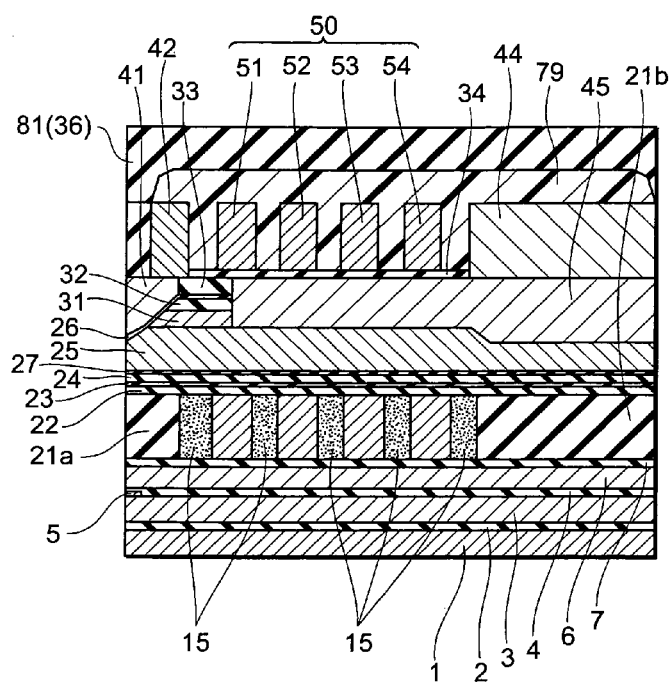
FIGS. 15A and 15B are sectional views corresponding to FIGS. 1A and 1B, respectively, showing a step subsequent to that of FIG. 14.
Figure 15B:
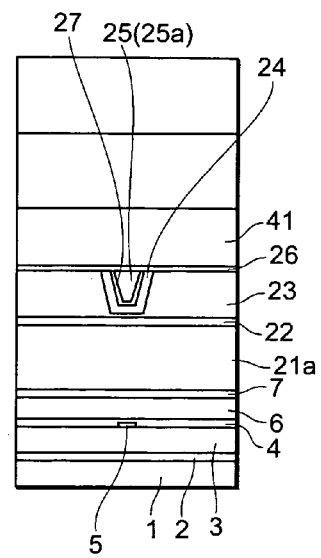

Next, as shown in FIGS. 15A and 15B, a third cover insulating film 81 which can cover the surface of the multilayer body is formed by an insulating material such as alumina ($Al_2O_3$). Subsequently, the surface of the multilayer body is polished by CMP until the upper thin-film coil 50 emerges, so as to be made flat.

Figure 16A:
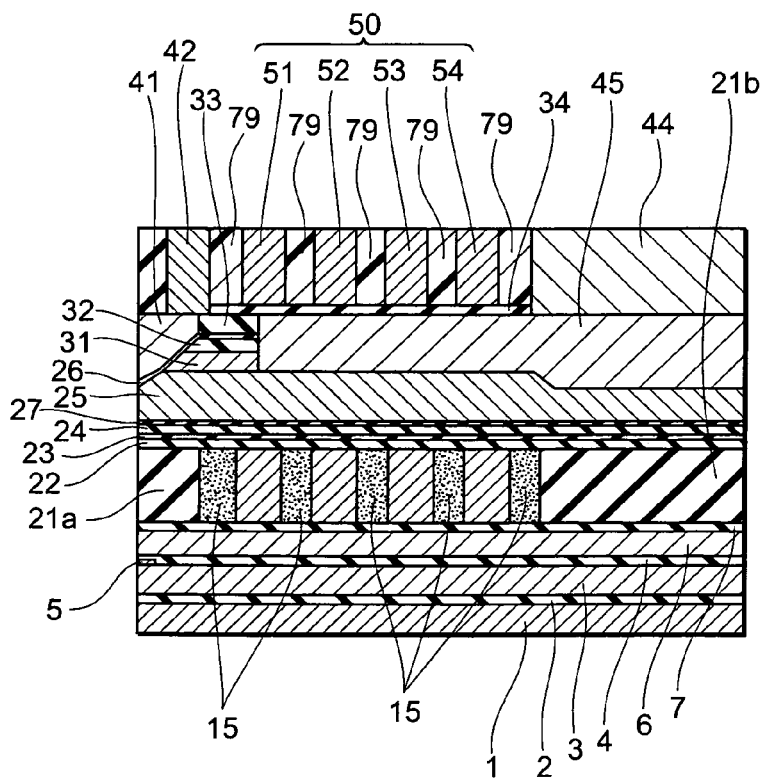
FIGS. 16A and 16B are sectional views corresponding to FIGS. 1A and 1B, respectively, showing a step subsequent to that of FIG. 15.
Figure 16B:
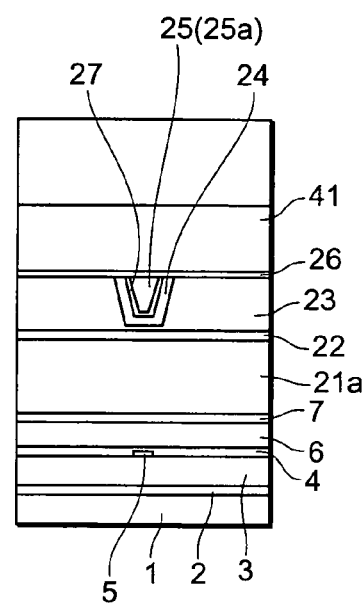

This yields a state where the photoresist layer 79 remains between the turn parts 51, 52, 53, 54 of the upper thin-film coil 50 as shown in FIGS. 16A and 16B. The part of the third cover insulating film 81 located closer to the ABS than is the front shield part 42 forms the upper opposing insulating layer 36. The photoresist layer 79 also remains between the front shield part 42 and turn part 51 and between the rear shield part 44 and turn part 54.

Next, the photoresist layer 79 remaining on the surface of the multilayer body is removed. This forms gaps 82 between the turn parts 51, 52, 53, 54 as shown in FIGS. 17A and 17B. Here, the gaps 82 are also obtained between the front shield part 42 and turn part 51 and between the rear shield part 44 and turn part 54. In these gaps 82, the gap 82 between the front shield part 42 and turn part 51 is arranged closer to the ABS than is the upper thin-film coil 50 and thus becomes a front gap 82a. The gaps 82 are provided for forming the above-mentioned upper non-expandable parts 55, respectively. The gaps 82 are delimited by the turn parts 51, 52, 53, 54, front shield part 42, and rear shield part 44, so as to be defined in terms of position, form, and size.

Figure 18A:
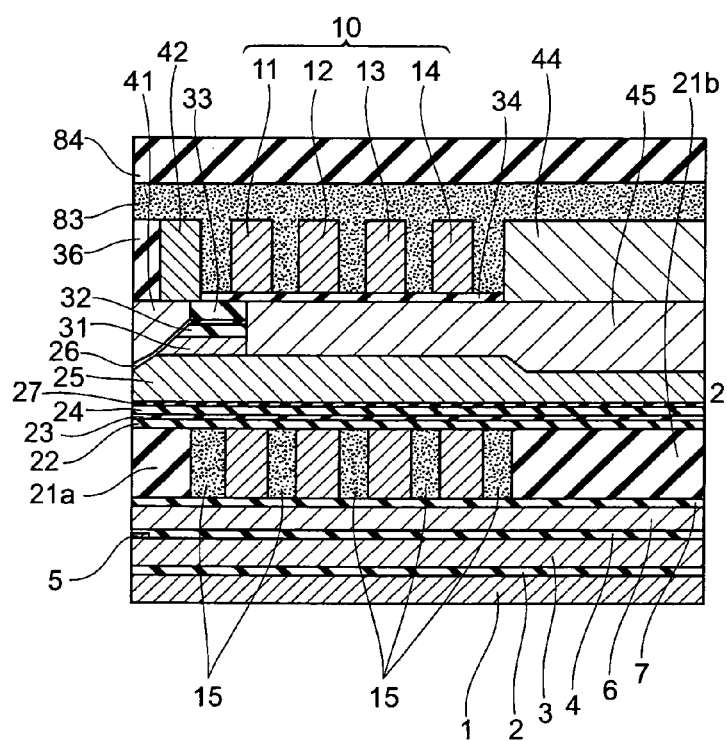
FIGS. 18A and 18B are sectional views corresponding to FIGS. 1A and 1B, respectively, showing a step subsequent to that of FIG. 17.
Figure 18B:
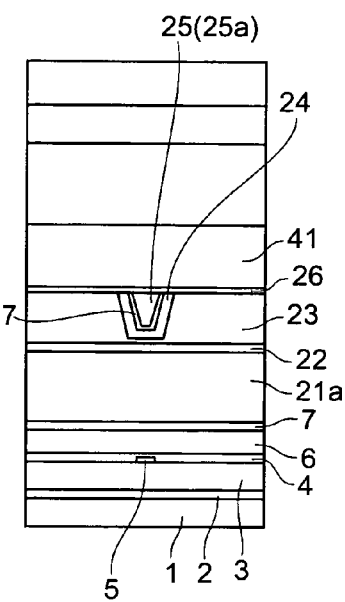

Subsequently, as shown in FIGS. 18A and 18B, SOG (Spin On Glass) is applied as an insulating filler to the surface of the multilayer body, so as to form an SOG film 83 (having a thickness of about 2000 to 5000 Å). Further, a fourth cover insulating film 84 (having a thickness of about 1 to 2 μm) which can cover the surface of the multilayer body is formed on the multilayer body by an insulating material such as alumina ($Al_2O_3$). Thereafter, the surface of the multilayer body is polished by CMP, for example, until the upper thin-film coil 50 emerges, so as to be made flat.

Figures 19A, 19B:
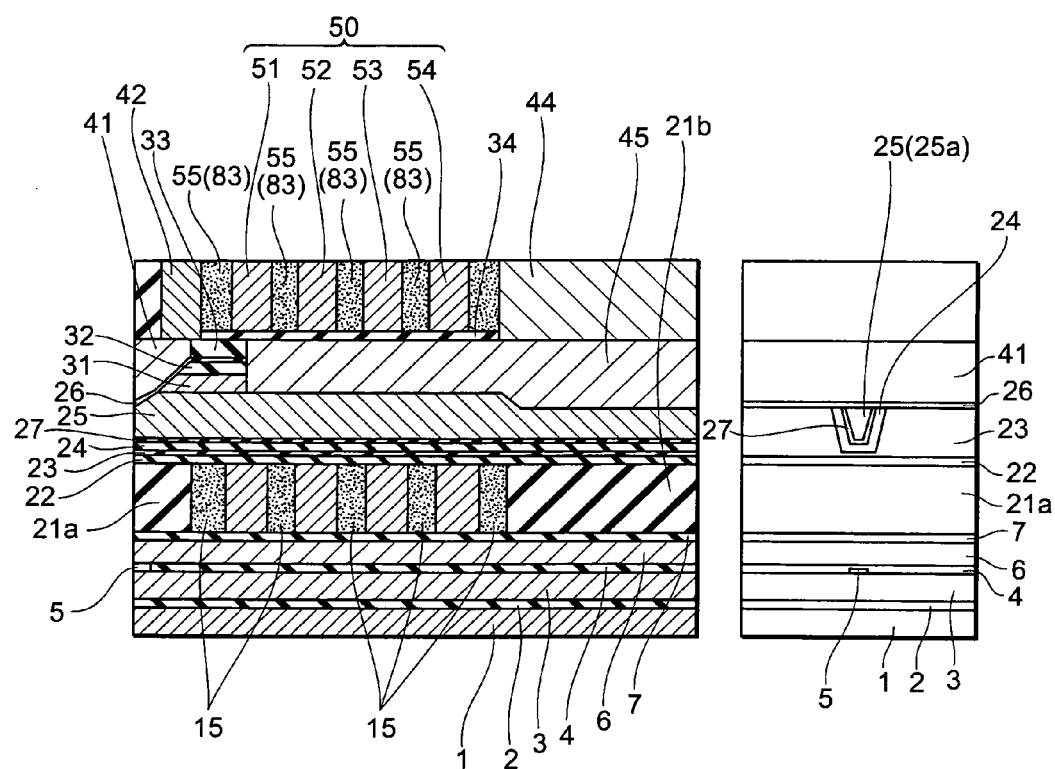
FIGS. 19A and 19B are sectional views corresponding to FIGS. 1A and 1B, respectively, showing a step subsequent to that of FIG. 18.

This can fill the interstices between the turn parts 51, 52, 53, 54, i.e., the gaps 82, with the SOG film 83 as shown in FIGS. 19A and 19B. This can also fill the gap 82 (front gap 82a) between the front shield part 42 and turn part 51 and the gap 82 between the rear shield part 44 and turn part 54 with the SOG film 83. Thus interposed SOG film 83 can form the above-mentioned upper non-expandable parts 55.

Subsequently, an insulating layer is formed on the whole surface of the multilayer body by an insulating material such as alumina ($Al_2O_3$). This insulating layer will later become the second interlayer insulating layer 35. Then, after applying a photoresist to the whole surface of the multilayer body, patterning is performed with a predetermined photomask, so as to form a resist pattern (not depicted). Using this resist pattern as a mask, the insulating layer is etched away by RIE, for example, except for the parts formed with the upper thin-film coil 50 and upper non-expandable parts 55, so as to form the second interlayer insulating layer 35 as shown in FIGS. 1A and 1B.

Further, the connecting shield part 43 is formed on the second interlayer insulating layer 35 by frame plating. Thereafter, an insulating layer is formed on the whole surface of the multilayer body by an insulating material such as alumina ($Al_2O_3$). Then, the surface of the multilayer body is polished by CMP until the connecting shield part 43 emerges, so as to be made flat. This forms the connecting shield part 43 and opposing insulating layer 37.

Subsequently, the displacement suppression layer 60 is formed, and the protective layer 61 is formed by an insulating material such as alumina ($Al_2O_3$) so as to cover the displacement suppression layer 60, whereby the thin-film magnetic head 300 is completed.

While the thin-film magnetic head 300 has the lower and upper non-expandable parts 15, 55, the above-mentioned manufacturing process secures the respective gaps 72, 82 for forming the lower and upper non-expandable parts 15, 55 before forming them. Since the SOG as the insulating filler has an ability to infiltrate which is similar to that of the photoresist, it can fill the gaps 72, 82 when applied to the surface of the multilayer body as with the photoresist. Therefore, the above-mentioned manufacturing process applies the SOG to the surface of the multilayer body, so as to fill the gaps 72, 82 with the SOG, thereby forming the lower and upper non-expandable parts 15, 55.

The SOG for forming the lower and upper non-expandable parts 15, 55 contains a number of fine particles and thus is hard to hold heat, thereby favorably acting to diffuse heat. Therefore, the lower and upper non-expandable parts 15, 55 can be formed by the SOG.

However, the SOG is easier to lose its shape than the photoresist. Therefore, disadvantages such as cracks entering in the SOG may occur unless the applied SOG is immobilized by securing closed places such as the gaps 72, 82 where both sides are delimited by other parts beforehand at positions to be filled with the SOG.

If a coating film is formed from the SOG instead of the photoresist layer 70 in the manufacturing step shown in FIGS. 3A and 3B mentioned above, for example, the coating film must be made higher than the lower thin-film coil 10. However, this coating film has no members delimiting the same and thus is easy to collapse, thereby incurring cracks. In this case, the lower and upper non-expandable parts 15, 55 cannot be formed about the lower and upper thin-film coils 10, 50.

Therefore, the above-mentioned manufacturing process secures groove-like places (i.e., the gaps 72, 82) for forming the lower and upper non-expandable parts 15, 55 by using the photoresist and the like at positions to be formed with the lower and upper non-expandable parts 15, 55, removes the photoresist, and then fills the resulting gaps 72 and 82 with the SOG, thereby forming the lower and upper non-expandable parts 15, 55. This makes it possible to form the lower and upper non-expandable parts 15, 55 by the SOG having a low coefficient of thermal expansion and a favorable heat diffusing effect. Thus, this embodiment temporarily uses the photoresist as a member for securing places, i.e., the gaps 72, 82, for forming the lower and upper non-expandable parts 15, 55.

Second Embodiment

Structure of Thin-Film Magnetic Head

Figures 21A, 21B:
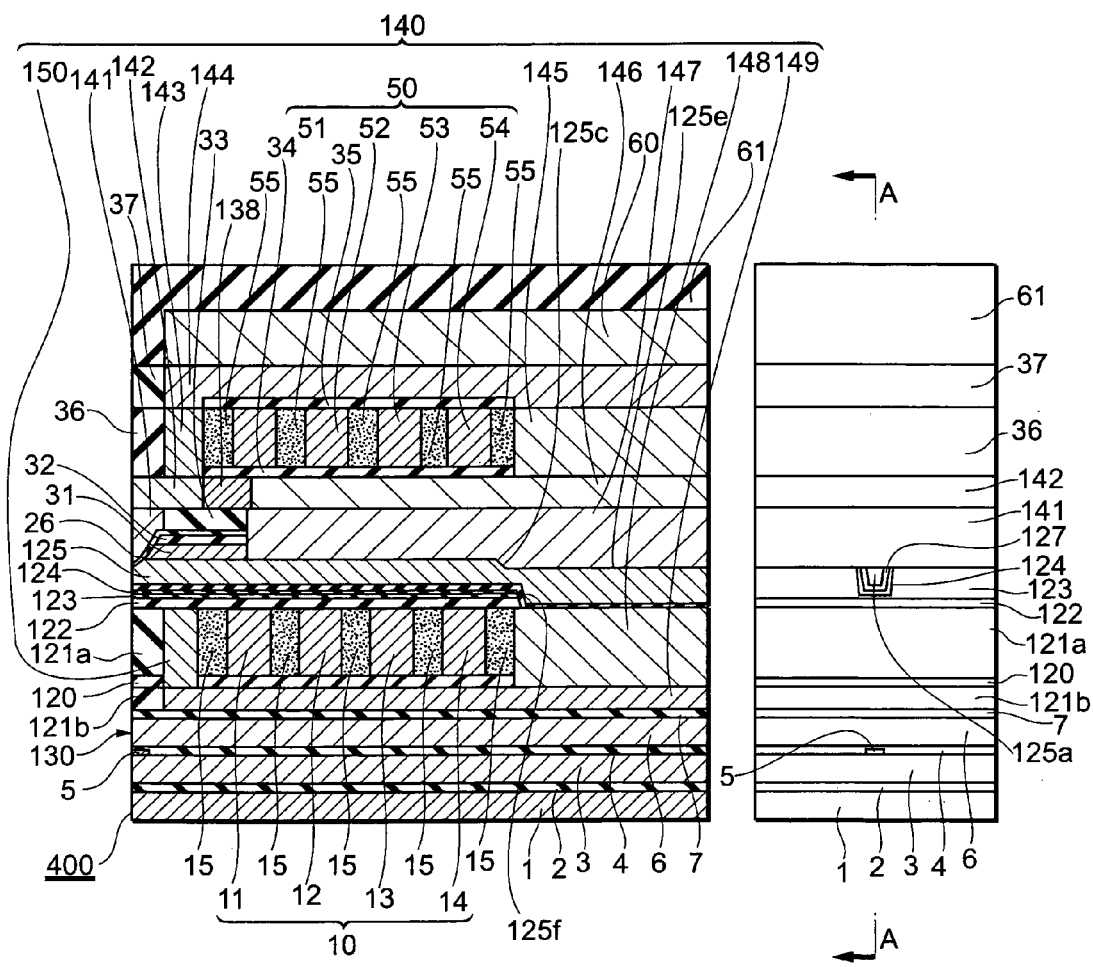

The structure of a thin-film magnetic head of perpendicular magnetic recording type in accordance with the second embodiment of the present invention will now be explained with reference to FIGS. 21A and 21B. FIG. 21A is a sectional view of the thin-film magnetic head 400 in accordance with the second embodiment of the present invention taken along the line A-A of FIG. 21B, which is a direction intersecting its ABS 130, while FIG. 21B is a front view showing the ABS 130.

As with the thin-film magnetic head 300, the thin-film magnetic head 400 comprises a substrate 1 and reproducing and recording heads laminated on the substrate 1, while having the ABS 130. Since the thin-film magnetic head 400 includes configurations identical to those of the thin-film magnetic head 300, configurations of the thin-film magnetic head 400 different from those of the thin-film magnetic head 300 will mainly be explained in the following, while omitting or simplifying their common configurations.

As in the thin-film magnetic head 300, the reproducing head includes an insulating layer 2, a lower shield layer 3, a shield gap film 4, an MR device 5, an upper shield layer 6, and an insulating layer 7 which are formed on the substrate 1.

The recording head includes a lower thin-film coil 10, an upper thin-film coil 50, lower non-expandable parts 15, upper non-expandable parts 55, a main magnetic pole layer 125, a gap layer 26, a write shield layer 140, a displacement suppression layer 60, and a protective layer 61 which are laminated on the substrate 1.

The recording head also includes a lower opposing insulating layer 121a and an upper opposing insulating layer 36 which are arranged closer to the ABS than is the lower thin-film coil 10.

The recording head includes not only a first interlayer insulating layer 34 and a second interlayer insulating layer 35, but also a third interlayer insulating layer 120 and a fourth interlayer insulating layer 122.

The lower thin-film coil 10 has four turn parts 11, 12, 13, 14 between a front shield part 150 and a rear shield part 148 which will be explained later. The lower thin-film coil 10 is connected to the upper thin-film coil 50 through an undepicted part, so as to form a series of coils, while being wound about the main magnetic pole layer 125.

The lower thin-film coil 50 has four turn parts 51, 52, 53, 54 between a front shield part 143 and a rear shield part 145 which will be explained later.

The lower non-expandable parts 15 are formed such as to be embedded between the turn parts 11, 12, 13, 14 of the lower thin-film coil 10, and are in direct contact with the turn parts 11, 12, 13, 14. The lower non-expandable part 15 is also formed such as to be embedded between the turn part 11 and front shield part 150, and is in direct contact with both of the turn part 11 and front shield part 150. The lower non-expandable part 15 is further formed such as to be embedded between the turn part 14 and rear shield part 148, and is in direct contact with both of the turn part 14 and rear shield part 148. The lower non-expandable parts 15 are constituted by SOG as in the first embodiment, and thus are excellent in diffusing the heat generated by the lower thin-film coil 10 to the outside without holding it inside.

The upper non-expandable parts 55 are formed such as to be embedded between the turn parts 51, 52, 53, 54 of the upper thin-film coil 50, and are in direct contact with the turn parts 51, 52, 53, 54. The upper non-expandable part 55 is also formed such as to be embedded between the turn part 51 and the front shield part 143, and is in direct contact with the turn part 51 and the front shield part 143. The upper non-expandable part 55 is further formed such as to be embedded between the turn part 54 and rear shield part 145, and is in direct contact with both of the turn part 54 and rear shield part 145. The upper non-expandable parts 55 are constituted by SOG as with the lower non-expandable parts 15, and thus are excellent in diffusing the heat generated by the upper thin-film coil 50 to the outside without holding it inside.

As shown in FIG. 21B, on the ABS side, the main magnetic pole layer 125 has a magnetic pole end face 125a which is shaped like a bevel as with the magnetic pole end face 25a.

The main magnetic pole layer 125 has a track width determining part having the magnetic pole end face 125a, and a wider part which is arranged at a position distanced more from the ABS 130 than is the track width determining part and has a width greater than that of the track width determining part. (The track width determining part and the wider part are not depicted.)

The main magnetic pole layer 125 has a tilted surface 125b (see FIG. 32A for details), an upper end face 125c, a slope 125d, an upper end face 125e, and a slope 125f. The tilted surface 125b is formed as an upslope as with the tilted surface 25b. The upper end face 125c is formed flat as with the upper end face 25c. The slope 125d is formed so as to descend slightly from the upper end face 125c. The upper end face 125e is formed flat as with the upper end face 25e. The slope 125f is formed on the lower thin-film coil 10 side of the main magnetic pole layer 125.

In the main magnetic pole layer 125, nonmagnetic layers 31, 32 are laminated on the upper end face 125c between an opposing shield part 141 and a routing shield part 147 which will be explained later. The main magnetic pole layer 125 is further laminated with a coating film 124 and a polishing stop layer 127.

The gap layer 26 is formed along the tilted surface 125b of the main magnetic pole layer 125 between the opposing shield part 141 and the main magnetic pole layer 125 and nonmagnetic layers 31, 32. The opposing shield part 141 is formed such as to oppose the main magnetic pole layer 125 and nonmagnetic layers 31, 32 on the ABS 130 side through the gap layer 26.

The write shield part 140 includes the opposing shield part 141, the front shield parts 142, 143, a connecting shield part 144, the rear shield part 145, and routing shield parts 146, 147. The write shield layer 140 further includes the front shield part 150, a connecting shield part 149, and the rear shield part 148.

The opposing shield part 141 has an end face exposed at the ABS 130 and is formed such as to oppose the main magnetic pole layer 125 and nonmagnetic layers 31, 32 successively from the ABS 130 side through the gap layer 26. The opposing shield part 141 has a flat upper face, to which the front shield part 142 is connected.

The front shield part 142 has an end face exposed at the ABS 130. The front shield part 142 is connected to the front shield part 141 on the ABS 130 side, and to the front shield part 143 at a position distanced from the ABS 130.

The front shield part 143 is arranged closer to the ABS 130 than are the upper non-expandable parts 55 and upper thin-film coil 50. The front shield part 143 is arranged between and in direct contact with the upper opposing insulating layer 36 and upper non-expandable parts 55. The front shield part 143 is connected to the front shield part 142 and connecting shield part 144.

The connecting shield part 144 is formed such as to straddle the upper non-expandable parts 55 and the upper thin-film coil 50, and connects the front shield part 143 and rear shield part 145 to each other.

The rear shield part 145 is arranged at a position distanced more from the ABS 130 than are the upper non-expandable parts 55 and the upper thin-film coil 50. The rear shield part 145 is in direct contact with the upper non-expandable part 55. The rear shield part 145 is connected to the connecting shield part 144 and the routing shield part 146.

The routing shield part 146 is formed so as to be routed from the rear shield part 145 to the ABS 130 side by bypassing the turn parts 52, 53, 54, a part of the turn part 51, and the upper non-expandable parts 55. The part of the routing shield part 146 routed from the rear shield part 145 to the ABS 130 side is in contact with the first interlayer insulating layer 34. The rear shield part 145 is connected to the routing shield part 146 at a position distanced more from the ABS 130 than are the upper thin-film coil 50 and upper non-expandable parts 55, while the routing shield part 147 is connected thereto on the opposite side.

As with the routing shield part 146, the routing shield part 147 is formed so as to be routed from the rear shield part 145 to the ABS 130 side by bypassing the turn parts 52, 53, 54, a part of the turn part 51, and the upper non-expandable parts 55. The routing shield part 146 is connected to the routing shield part 147 at the surface on the upper thin-film coil 50 side, while the rear shield part 148 is connected thereto at the surface on the opposite side.

The rear shield part 148 is arranged at a position distanced more from the ABS 130 than are the lower non-expandable parts 15 and lower thin-film coil 10. The rear shield part 148 is in contact with the upper non-expandable parts 55. The rear shield part 148 is connected to the connecting shield part 149 and routing shield part 147.

The connecting shield part 149 is formed such as to straddle the lower non-expandable parts 15 and lower thin-film coil 10, and connects the front shield part 150 and rear shield part 148 to each other.

The front shield part 150 is arranged closer to the ABS 130 than are the lower non-expandable parts 15 and lower thin-film coil 10. The front shield part 150 is arranged between and in direct contact with the lower opposing insulating layer 121a and lower non-expandable parts 15.

As in the foregoing, the thin-film magnetic head 400 has the lower and upper non-expandable parts 15, 55 similar to those of the thin-film magnetic head 300. The lower and upper non-expandable parts 15, 55 have a low coefficient of thermal expansion, and thus hardly expand even when heat generated by the lower and upper thin-film coils 10, 50 is applied thereto. Consequently, even when a current is caused to flow through the lower and upper thin-film coils 10, 50, the lower opposing insulating layer 121a and front shield part 150 arranged closer to the ABS 130 than are the lower non-expandable parts 15 and the upper opposing insulating layer 36 and front shield part 143 arranged closer to the ABS 130 than are the upper non-expandable parts 55 are kept from being pushed out toward the ABS 130.

Therefore, as with the thin-film magnetic head 300, the thin-film magnetic head 400 can restrain the write shield layer 140 from projecting as the lower and upper thin-film coils 10, 50 generate heat. As a consequence, the thin-film magnetic head 400 is very unlikely to be damaged by the projection of the recording head and thus can approach recording media. Hence, the thin-film magnetic head 400 can reduce the flying height of the slider from the recording medium surface, thereby enhancing the resolution and improving the signal-to-noise ratio in any of the recording and reproducing heads.

In the thin-film magnetic head 400 in particular, not only the front shield part 143 is formed on the ABS 130 side of the upper thin-film coil 50, but also the front shield part 150 is formed on the ABS 130 side of the lower thin-film coil 10. However, even for the lower thin-film coil 10, the lower non-expandable parts 15 are formed between the turn part 11 and the front shield part 150. Hence, the lower non-expandable parts 15 restrain the front shield part 150 from projecting, whereby the flying height of the slider from the recording medium surface can be reduced.

Method of Manufacturing Thin-Film Magnetic Head

A method of manufacturing the thin-film magnetic head 400 in accordance with the second embodiment having the structure mentioned above will now be explained with reference to FIGS. 22A, 22B to 37A, and 37B together with FIGS. 21A and 21B mentioned above.

FIGS. 22A to 37A are sectional views corresponding to FIG. 21A in respective steps of manufacturing the thin-film magnetic head 400, while FIGS. 22B to 37B are sectional views similarly corresponding to FIG. 21B.

Figures 22A, 22B:
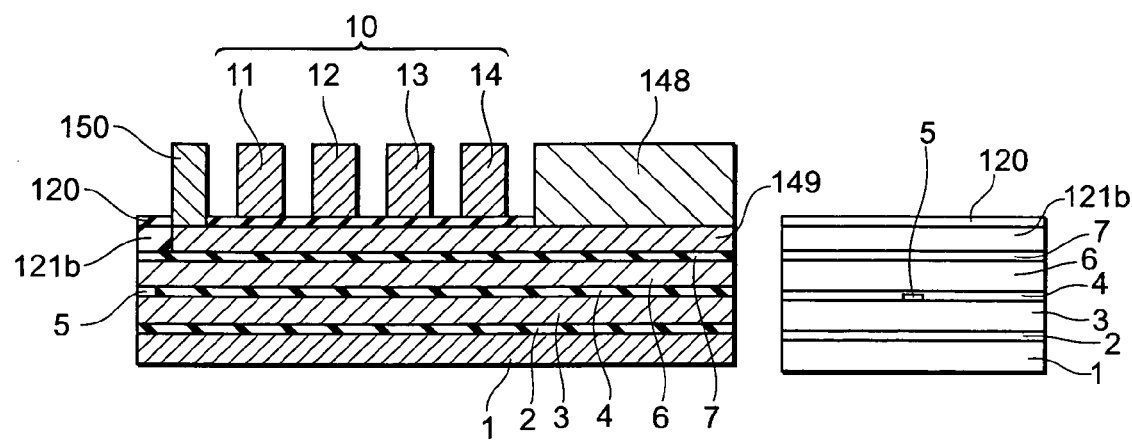
FIGS. 22A and 22B are sectional views corresponding to FIGS. 21A and 21B, respectively, in a step of manufacturing the thin-film magnetic head in accordance with the second embodiment.

First, as shown in FIGS. 22A and 22B, the insulating layer 2, lower shield layer 3, shield gap film 4, MR device 5, and upper shield layer 6 are formed on the substrate 1 as in the case of the thin-film magnetic head 300. Also, the insulating film 7 is formed on the upper shield layer 6. The foregoing step yields a multilayer body for forming the recording head. Thereafter, a magnetic layer for forming the connecting shield part 149 is formed, an insulating layer is formed on the surface of the multilayer part, and the surface of the multilayer body is flattened by the CMP. This forms a lower opposing insulating layer 121b and the connecting shield part 149.

Subsequently, an insulating layer is formed on the whole surface of the multilayer body. This insulating layer will later become the third interlayer insulating layer 120. Then, after applying a photoresist to the whole surface of the multilayer body, patterning with a predetermined photomask is performed, so as to form a resist pattern (not depicted). Using this resist pattern as a mask, the insulating layer is etched away by RIE, for example, except for parts for forming the lower thin-film coil 10 and the part to be formed later with the lower opposing insulating layer 121a, so as to form the third interlayer insulating layer 120 as shown in FIGS. 22A and 22B.

Then, the lower thin-film coil 10 in the thin-film coils is formed on the third interlayer insulating layer 120 by frame plating. Thereafter, the front shield part 150 and rear shield part 148 are formed by frame plating. The lower thin-film coil 10 and the front and rear shield parts 150, 148 may be formed in reverse order as well.

Figures 23A, 23B:
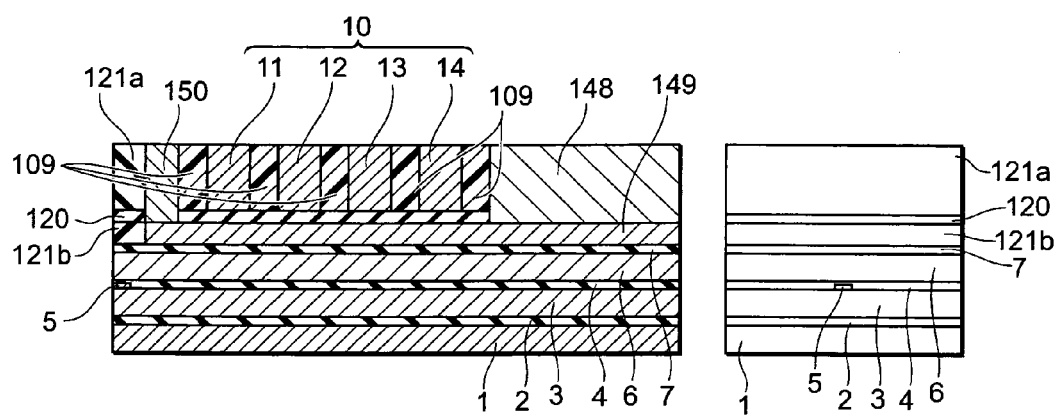
FIGS. 23A and 23B are sectional views corresponding to FIGS. 21A and 21B, respectively, showing a step subsequent to that of FIG. 22.

Next, the photoresist is applied to the surface of the multilayer body such as to cover the lower thin-film coil 10 and the front and rear shield parts 150, 148. Subsequently, a first cover insulating film (not depicted) which can cover the surface of the multilayer body is formed. Then, the surface of the multilayer body is polished by CMP until the lower thin-film coil 10 emerges, so as to be made flat. This forms a state where a photoresist layer 109 remains between the turn parts 11, 12, 13, 14 of the lower thin-film coil 10 as shown in FIGS. 23A and 23B. The part of the first cover insulating film located closer to the ABS 130 than is the front shield part 150 forms the lower opposing insulating layer 121a. The photoresist layer 109 also remains between the front shield part 150 and turn part 11 and between the rear shield part 148 and turn part 14.

Figures 24A, 24B:
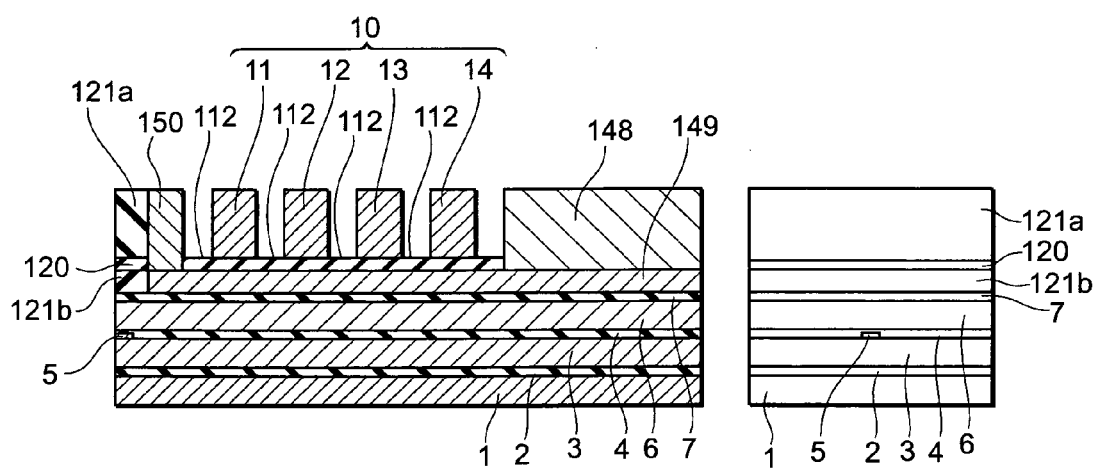
FIGS. 24A and 24B are sectional views corresponding to FIGS. 21A and 21B, respectively, showing a step subsequent to that of FIG. 23.

Next, the photoresist layer 109 remaining on the surface of the multilayer body is removed. This forms groove-like gaps 112 between the turn parts 11, 12, 13, 14 as shown in FIGS. 24A and 24B. Here, the gaps 112 are also obtained between the front shield part 150 and turn part 11 and between the rear shield part 148 and turn part 14. The gaps 112 are provided for forming the above-mentioned lower non-expandable parts 15, respectively. As with the gaps 72, the gaps 112 are defined in terms of position, form, and size.

Subsequently, as shown in FIGS. 25A and 25B, SOG is applied to the surface of the multilayer body, so as to form an SOG film 113. Further, a second cover insulating film 114 (having a thickness of about 1 to 2 µm) which can cover the surface of the multilayer body is formed by an insulating material such as alumina ($Al_2O_3$). Thereafter, the surface of the multilayer body is polished by CMP until the lower thin-film coil 10 emerges, so as to be made flat.

This can fill the interstices between the turn parts 11, 12, 13, 14, i.e., the gaps 112, with the SOG film 113 as shown in FIGS. 26A and 26B. This can also fill the gap 112 between the front shield part 150 and turn part 11 and the gap 112 between the rear shield part 148 and turn part 14 with the SOG film 113. Thus interposed SOG film 113 can form the above-mentioned lower non-expandable parts 15.

Figures 27A, 27B:
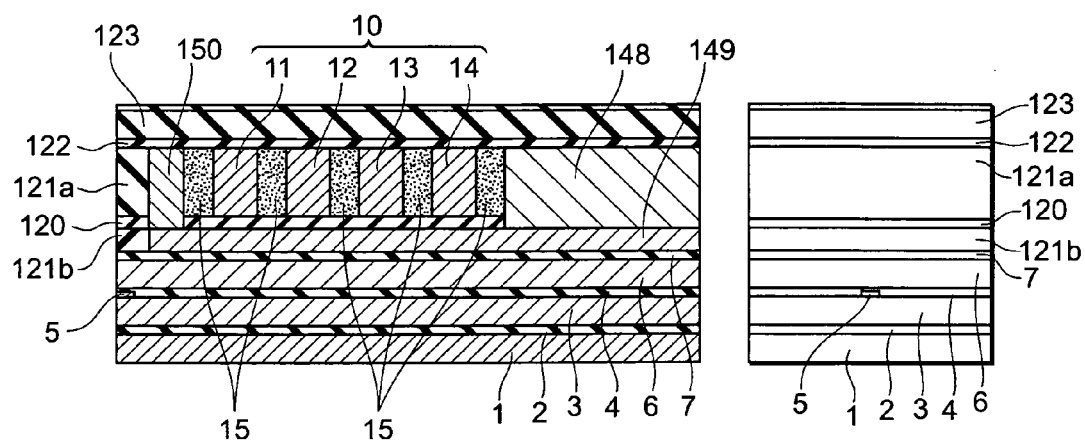
FIGS. 27A and 27B are sectional views corresponding to FIGS. 21A and 21B, respectively, showing a step subsequent to that of FIG. 26.

Subsequently, as shown in FIGS. 27A and 27B, an intermediate insulating layer 122 is formed on the whole surface of the multilayer body by an insulating material such as alumina ($Al_2O_3$).

Further, a base insulating layer 123 is formed on the surface of the multilayer body by an insulating material such as alumina ($Al_2O_3$). Subsequently, a nonmagnetic metal layer 123b is formed on the base insulating layer 123. Then, after applying a photoresist to the surface of the multilayer body, patterning with a predetermined photomask is performed, so as to form a resist pattern by which the surface of the multilayer body is exposed as a form corresponding to a cavity 180 which will be explained later.

Figures 28A, 28B:
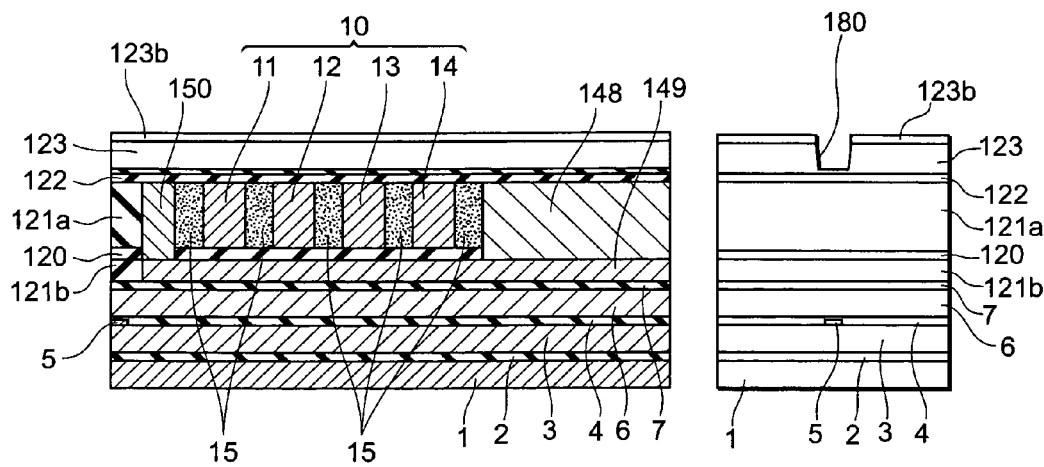
FIGS. 28A and 28B are sectional views corresponding to FIGS. 21A and 21B, respectively, showing a step subsequent to that of FIG. 27.

Subsequently, using the resist pattern as a mask, RIE is performed, so as to remove the part uncoated with the resist pattern in the surface of the multilayer body. This forms the cavity 180 in the base insulating layer 123 as shown in FIGS. 28A and 28B. For forming the main magnetic pole layer 125 with designed size and form, the cavity 180 is made by depressing a part of the base insulating layer 123 into a form corresponding to the outer form of the main magnetic pole layer 125. When forming the cavity 180, a part of the intermediate insulating layer 122 is removed, so as to connect the main magnetic pole layer 125 and the rear shield part 148 to each other.

Next, as shown in FIGS. 29A and 29B, the coating film 124 made of alumina ($Al_2O_3$), Ta, W, TiN, or the like is formed on the whole surface of the multilayer body by CVD or sputtering. Thereafter, the polishing stop layer 127 to become a stopper for CMP is formed by a thickness of about 400 to 600 Å by Ta or Ru so as to cover the cavity 180.

Thereafter, a magnetic layer 175 having a thickness of about 0.5 to 0.8 µm is formed on the whole surface of the multilayer body by sputtering with a magnetic material such as CoNiFe, CoFe, or NiFe. This magnetic layer 175 will later form the main magnetic pole layer 125. The foregoing steps place the multilayer body into the state shown in FIGS. 29A and 29B.

Figure 30A:
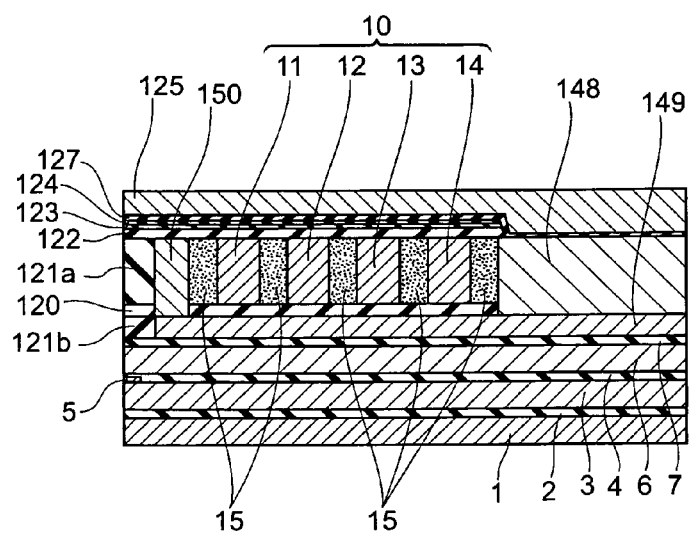
FIGS. 30A and 30B are sectional views corresponding to FIGS. 21A and 21B, respectively, showing a step subsequent to that of FIG. 29.
Figure 30B:
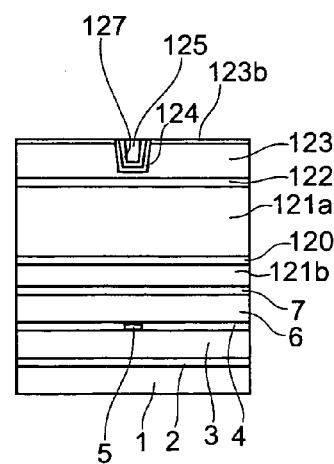

Subsequently, the whole surface of the multilayer body is polished by CMP, so as to become flat as shown in FIGS. 30A and 30B. Here, the polishing stop layer 127 functions as a stopper for CMP, whereby the CMP stops at the time when the polishing stop layer 127 is exposed.

Figures 31A, 31B:
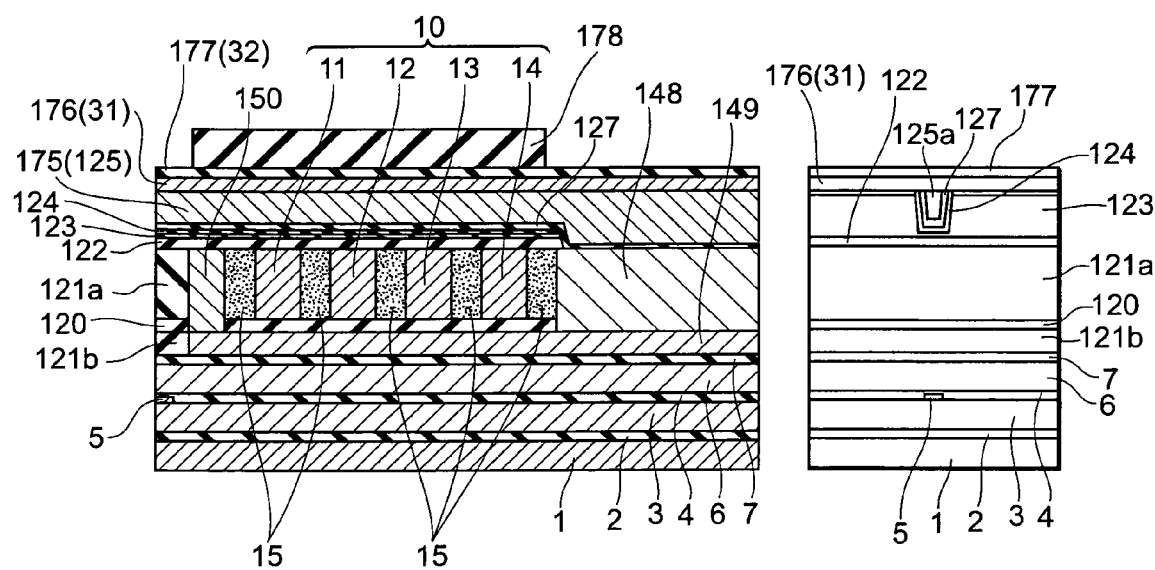
FIGS. 31A and 31B are sectional views corresponding to FIGS. 21A and 21B, respectively, showing a step subsequent to that of FIG. 30.

Thereafter, as shown in FIGS. 31A and 31B, a nonmagnetic layer 176 is formed on the whole surface of the multilayer body by sputtering with a metal material such as R, NiCr, or NiCu. The nonmagnetic layer 176 will partly be etched away later, so as to become the above-mentioned nonmagnetic layer 31. Further, a nonmagnetic layer 177 is formed on the whole surface of the multilayer body. The nonmagnetic layer 177 will partly be etched away later, so as to become the above-mentioned nonmagnetic layer 32.

Subsequently, after applying a photoresist to the whole surface of the multilayer body, patterning with a predetermined photomask is performed, so as to form a resist pattern 178. Then, using the resist pattern 178 as a mask, etching such as RIE, for example, is performed, so as to remove a part of the nonmagnetic layer 177. The etching in this case is performed such as to stop at the time when the bottom part of a groove formed by etching reaches the upper face of the nonmagnetic layer 176. To this aim, a material yielding an etching rate lower than that of the nonmagnetic layer 177 is used for the nonmagnetic layer 176.

Figures 32A, 32B:
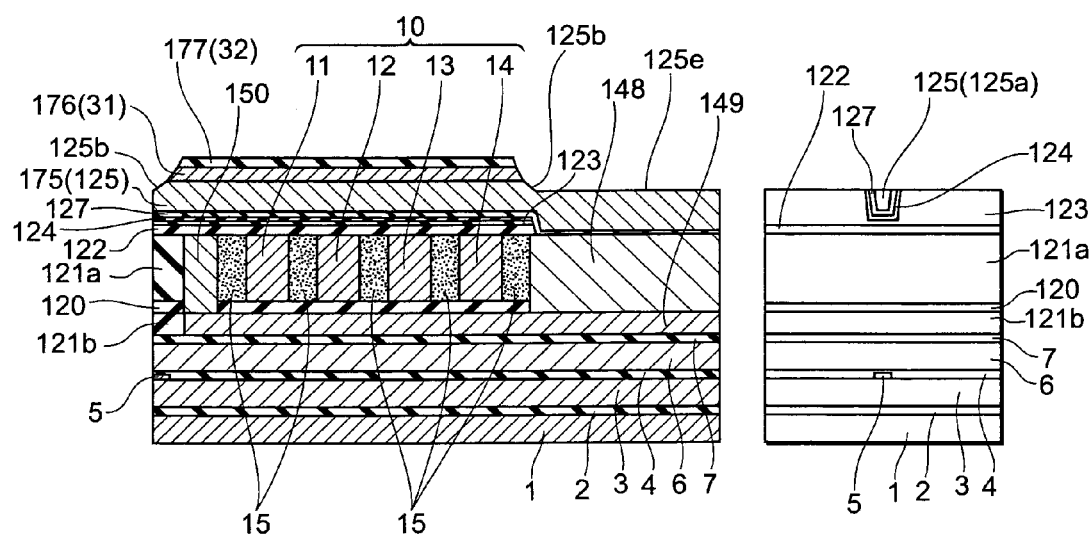
FIGS. 32A and 32B are sectional views corresponding to FIGS. 21A and 21B, respectively, showing a step subsequent to that of FIG. 31.

Next, as shown in FIGS. 32A and 32B, the resist pattern 178 is removed. Then, using the remaining nonmagnetic layer 177 as a mask, a part of the nonmagnetic layer 176 is etched away by IBE, for example. Further, using the remaining nonmagnetic layer 176 as a mask, a part of the nonmagnetic layer 175 is etched away by IBE, for example. This step forms the tilted surface 125b on the ABS side of the magnetic layer 175. The slope 125d and upper end face 125e are also formed at positions distanced from the ABS in the magnetic layer 175.

Subsequently, the gap layer 26 is formed on the whole surface of the multilayer body by an insulating material such as alumina ($Al_2O_3$) or a nonmagnetic conductive material such as Ru, NiCu, or Ta.

Further, an undepicted stopper film is formed by sputtering, for example, and a nonmagnetic film is formed thereon. Subsequently, an undepicted photoresist is applied to the whole surface of the multilayer body. Then, patterning with a predetermined photomask is performed, so as to form an undepicted resist pattern. Using this resist pattern as a mask, the nonmagnetic film is etched by RIE, for example. The etching is performed such as to stop when the bottom part of a groove formed by etching reaches the upper face of the stopper film. Then, after removing the resist pattern that is not depicted, the remaining film is used as a mask for partly etching the gap layer 26 and nonmagnetic layers 176, 177 away by RIE or the like. Here, the gap layer 26 and nonmagnetic layers 176, 177 are partly removed, so as to secure a space for forming the above-mentioned routing shield part 147.

Thereafter, a magnetic layer having a thickness of about 0.5 to 1.0 μm is formed on the whole surface of the multilayer body by plating with a magnetic material such as CoNiFe, CoFe, CoFeN, or NiFe. This magnetic layer will later become the opposing shield part 141 and routing shield part 147.

Figure 33A:
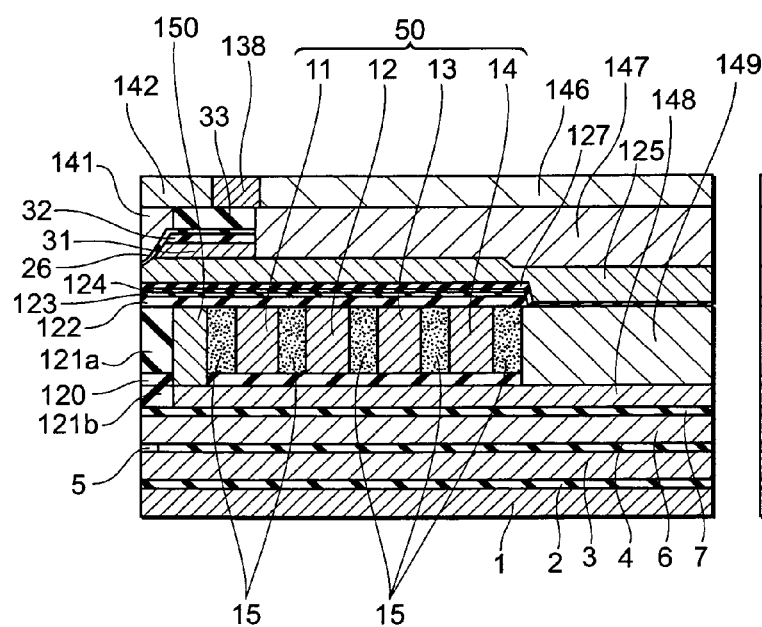
FIGS. 33A and 33B are sectional views corresponding to FIGS. 21A and 21B, respectively, showing a step subsequent to that of FIG. 32.
Figure 33B:
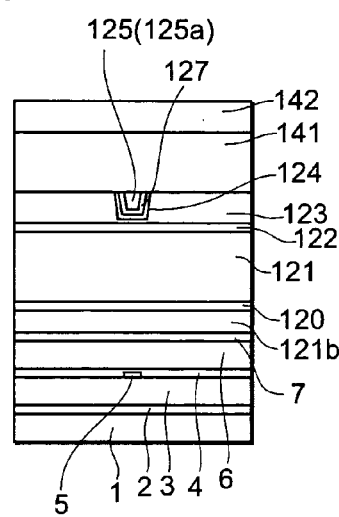

Subsequently, an insulating layer is formed on the whole surface of the multilayer body by an insulating material such as alumina ($Al_2O_3$). This insulating layer will later become the insulating layer 33. Then, the whole surface of the multilayer body is polished by CMP, so as to become flat. This forms the opposing shield part 141, routing shield part 147, and insulating layer 33 as shown in FIGS. 33A and 33B.

Thereafter, a magnetic layer is formed on the whole surface of the multilayer body by plating with a magnetic material such as CoNiFe, CoFe, CoFeN, or NiFe. This magnetic layer will later become the front shield part 142 and routing shield part 146.

Further, an insulating layer is formed on the whole surface of the multilayer body again by an insulating material such as alumina ($Al_2O_3$). This insulating layer will later become an insulating layer 138. Subsequently, the whole surface of the multilayer body is polished by CMP, so as to become flat. This forms the front shield part 142, routing shield part 146, and insulating layer 138 as shown in FIGS. 33A and 33B.

Next, an insulating layer is formed on the whole surface of the multilayer body by an insulating material such as alumina ($Al_2O_3$). This insulating layer will later become the first interlayer insulating layer 34. Then, after applying a photoresist to the whole surface of the multilayer body, patterning with a predetermined photomask is performed, so as to form a resist pattern (not depicted). Using this resist pattern as a mask, the insulating layer is etched away by RIE, for example, except for parts for forming the upper thin-film coil 50 and upper non-expandable parts 55, so as to form the first interlayer insulating layer 34 as shown in FIGS. 34A and 34B.

Subsequently, the upper thin-film coil 50 in the thin-film coils is formed on the first interlayer insulating layer 34 by frame plating. Then, by frame plating, the front shield part 143 and the rear shield part 145, each having a thickness of about 0.4 to 0.6 μm, are formed closer to and farther from the ABS than is the upper thin-film coil 50, respectively. The upper thin-film coil 50 and the front and rear shield parts 143, 145 may be formed in reverse order as well.

Thereafter, a photoresist is applied to the surface of the multilayer body such as to cover the upper thin-film coil 50, the front shield part 143 and rear shield part 145. Subsequently, a third cover insulating film (not depicted) which can cover the surface of the multilayer body is formed by an insulating material such as alumina ($Al_2O_3$).

Next, the surface of the multilayer body is polished by CMP until the upper thin-film coil 50 emerges, so as to be made flat. This yields a state where the photoresist layer 179 remains between the turn parts 51, 52, 53, 54 of the upper thin-film coil 50 as shown in FIGS. 34A and 34B. The part of the third cover insulating film located closer to the ABS 130 than is the upper thin-film coil 50 forms the upper opposing insulating layer 36. The photoresist layer 179 also remains between the front shield part 143 and turn part 51 and between the rear shield part 145 and turn part 54.

Figure 35A:
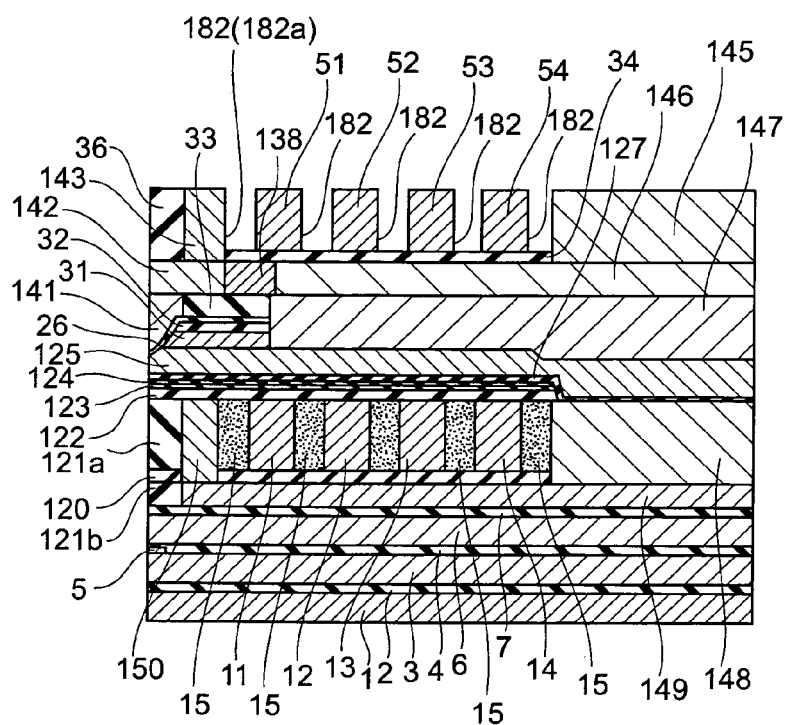
FIGS. 35A and 35B are sectional views corresponding to FIGS. 21A and 21B, respectively, showing a step subsequent to that of FIG. 34.
Figure 35B:
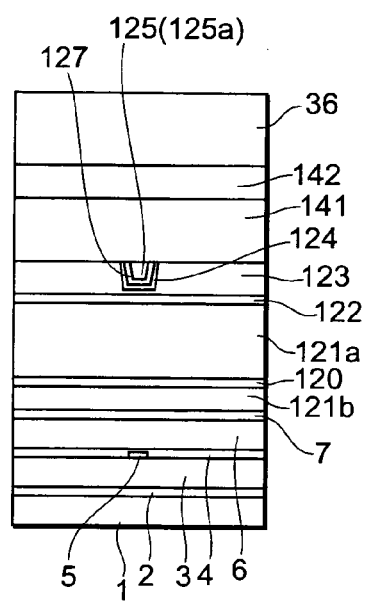

Next, the photoresist layer 179 remaining on the surface of the multilayer body is removed. This forms gaps 182 between the turn parts 51, 52, 53, 54 as shown in FIGS. 35A and 35B.

Here, the gaps 182 are also obtained between the front shield part 143 and turn part 51 and between the rear shield part 145 and turn part 54. In these gaps 182, the gap 182 between the front shield part 143 and turn part 51 is arranged closer to the ABS than is the upper thin-film coil 50 and thus becomes a front gap 182a. The gaps 182 are provided for forming the above-mentioned upper non-expandable parts 55, respectively, and are defined in terms of position, form, and size.

Figures 36A, 36B:
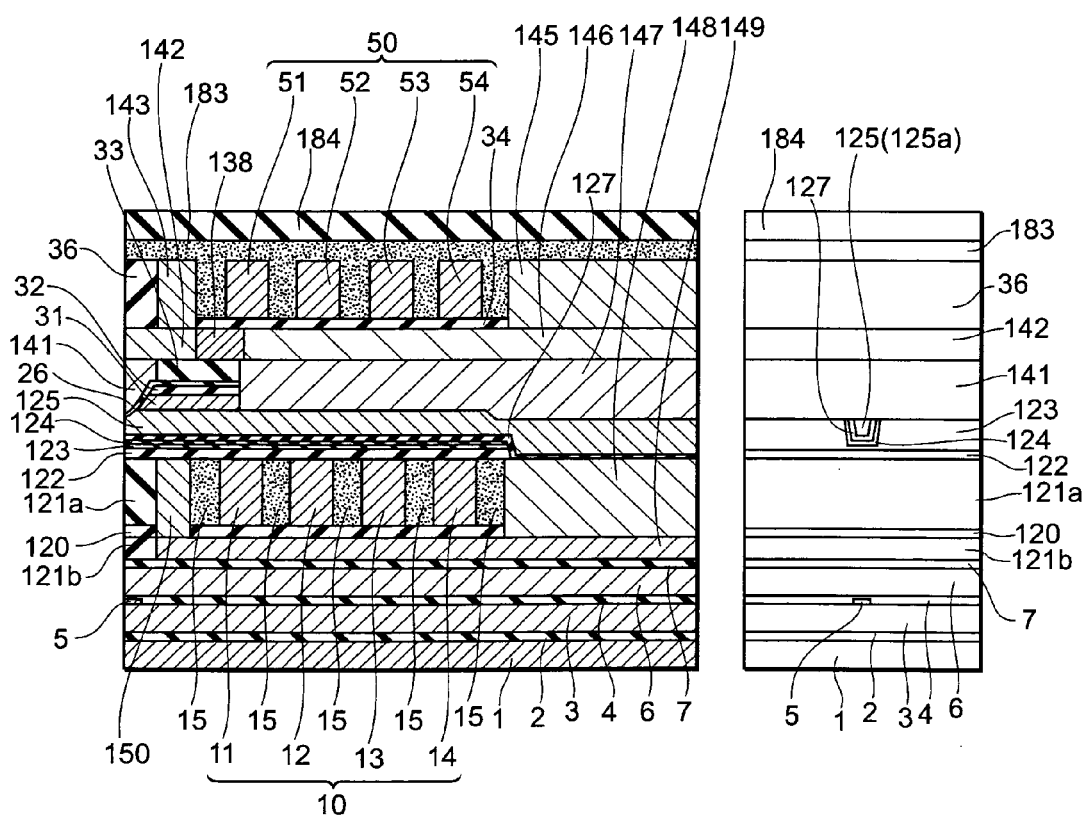
FIGS. 36A and 36B are sectional views corresponding to FIGS. 21A and 21B, respectively, showing a step subsequent to that of FIG. 35.

Subsequently, as shown in FIGS. 36A and 36B, SOG is applied to the surface of the multilayer body, so as to form an SOG film 183. Further, a fourth cover insulating film 184 (having a thickness of about 1 to 2 μm) which can cover the surface of the multilayer body is formed by an insulating material such as alumina ($Al_2O_3$). Thereafter, the surface of the multilayer body is polished by CMP, for example, until the upper thin-film coil 50 emerges, so as to be made flat.

Figure 37A:
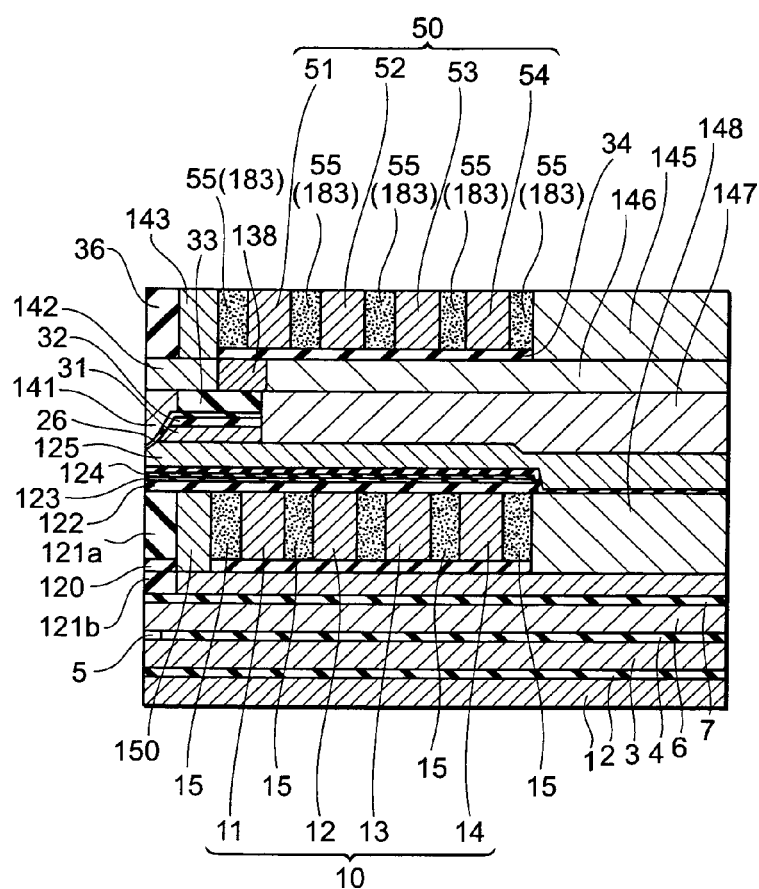
FIGS. 37A and 37B are sectional views corresponding to FIGS. 21A and 21B, respectively, showing a step subsequent to that of FIG. 36.
Figure 37B:
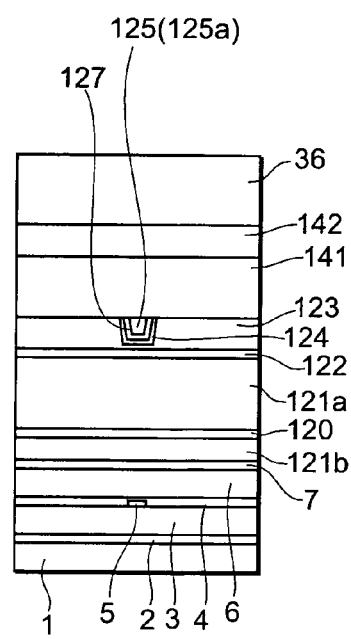

This can fill the interstices between the turn parts 51, 52, 53, 54, i.e., the gaps 182, with the SOG film 183 as shown in FIGS. 37A and 37B. This can also fill the gap 182 (front gap 182a) between the front shield part 143 and turn part 51 and the gap 182 between the rear shield part 145 and turn part 54 with the SOG film 183. Thus interposed SOG film 183 can form the above-mentioned upper non-expandable parts 55.

Performing the subsequent steps as in the case of the thin-film magnetic head 300 yields the thin-film magnetic head 400.

While the thin-film magnetic head 400 has the lower and upper non-expandable parts 15, 55, the above-mentioned manufacturing process secures the respective gaps 112, 182 for forming the lower and upper non-expandable parts 15, 55 before forming them and then applies SOG to the surface of the multilayer body. Therefore, the lower and upper non-expandable parts 15, 55 can be formed by embedding the SOG into the gaps 112 and 182 in the thin-film magnetic head 400 as in the thin-film magnetic head 300. Hence, the method of manufacturing the thin-film magnetic head 400 can form the lower and upper non-expandable parts 15, 55 by using the SOG that is easy to collapse while having a low coefficient of thermal expansion and a favorable heat diffusing action as in the thin-film magnetic head 300.

Embodiments of Head Gimbal Assembly and Hard Disk Drive

Embodiments of the head gimbal assembly and hard disk drive will now be explained.

Figure 38:
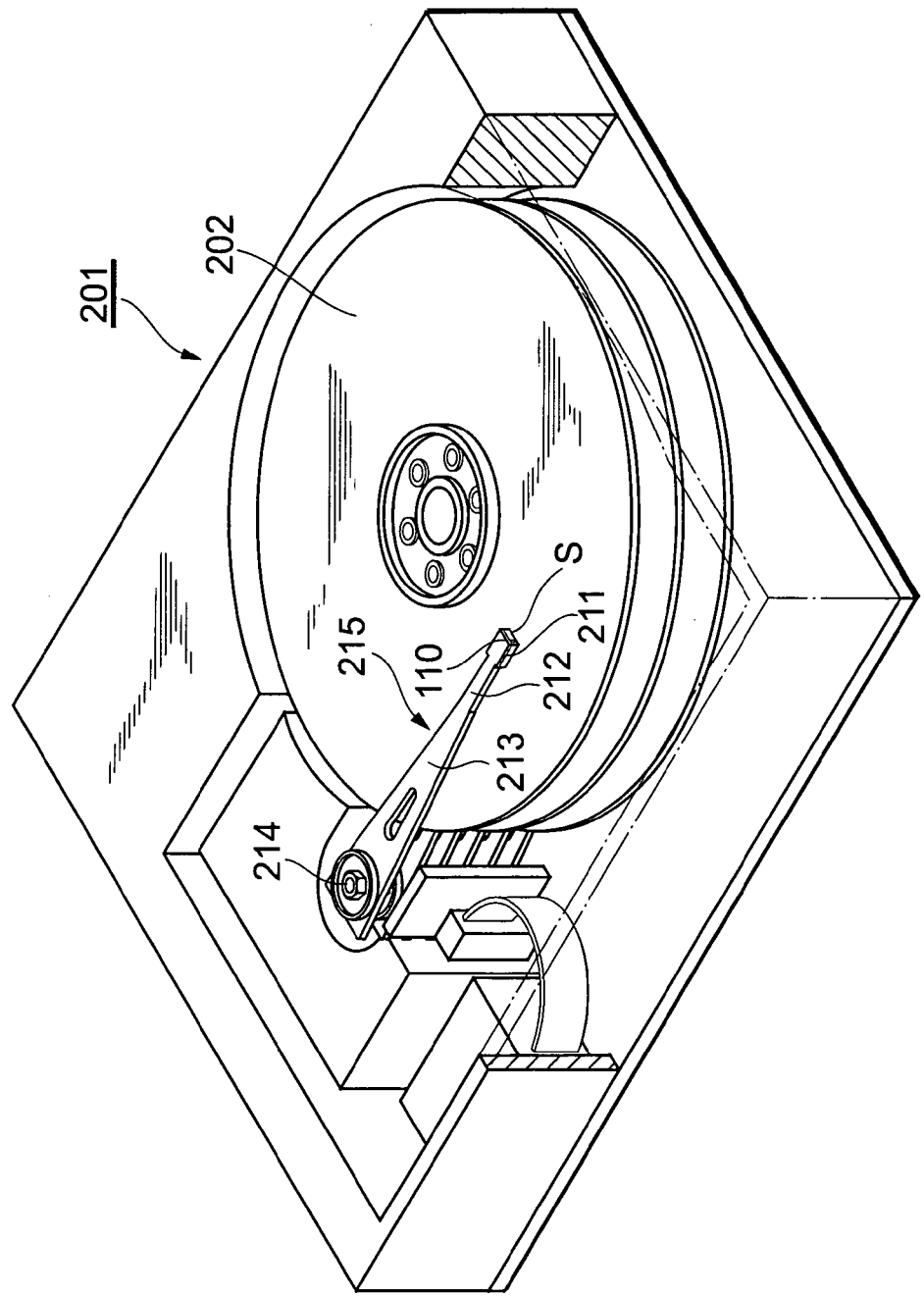
FIG. 38 is a perspective view showing a hard disk drive equipped with a thin-film magnetic head in accordance with an embodiment of the present invention.
Figure 39:
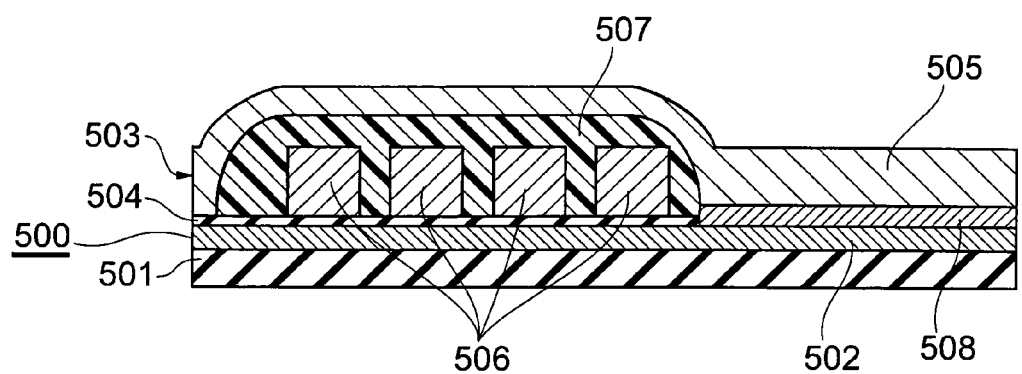
FIG. 39 is a sectional view showing an example of conventional thin-film magnetic heads.

FIG. 38 is a perspective view showing a hard disk drive 201 equipped with the above-mentioned thin-film magnetic head 300. The hard disk drive 201 includes a hard disk (recording medium) 202 rotating at a high speed and a head gimbal assembly (HGA) 215. The hard disk drive 201 is an apparatus which actuates the HGA 215, so as to record/reproduce magnetic information onto/from recording surfaces of the hard disk 202. The hard disk 202 has a plurality of (3 in the drawing) platters. Each platter has a recording surface opposing its corresponding thin-film magnetic head 300. In the HGA 215, a gimbal 212 mounted with a head slider 211 having a support formed with the thin-film magnetic head 300 and a suspension arm 213 supporting the gimbal 212 are arranged at the recording surface of each platter and can be rotated about a shaft 214 by a voice coil motor, for example, which is not depicted. When the HGA 215 is rotated, the head slider 211 moves in a radial direction of the hard disk 202, i.e., a direction traversing track lines.

Such HGA 215 and hard disk drive 201 have the thin-film magnetic head 300, and thus can reduce the flying height from the surface of the hard disk 202, thereby allowing the head slider 211 to approach the hard disk 202.

Though the above-mentioned embodiments explain a type (type 1) in which a thin-film coil is wound about the main magnetic pole layer by way of example, the present invention is also applicable to a type (type 2) in which the thin-film coil is wound like a flat spiral about the write shield layer.

What is claimed is:

1. A thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate;
   wherein the thin-film coil has a plurality of turn parts arranged at respective positions having different distances from the medium-opposing surface;
   wherein a non-expandable part made of an insulating material having a coefficient of thermal expansion smaller than that of a photosensitive resin is formed between the turn parts, an upper surface of the non-expandable part being level with an upper surface of the turn parts;
   wherein the write shield layer is formed with a magnetic material and has a front shield part, a rear shield part, and a connecting shield part connecting the front and rear shield parts to each other, the connecting shield part being in direct contact with both the front shield part and the rear shield part;
   wherein the write shield layer further includes an opposing shield part that is in direct contact with the gap layer and opposes the main magnetic pole layer through the gap layer;
   wherein the front shield part, the connecting shield part and the rear shield part are distanced from the medium-opposing surface, an upper surface of the front shield part being level with an upper surface of the rear shield part;
   wherein the front shield part is closer to the medium-opposing surface than is the thin-film coil; and
   wherein the rear shield part is further from the medium-opposing surface than is the thin-film coil.

2. A thin-film magnetic head according to claim 1, further comprising an opposing insulating layer arranged closer to the medium-opposing surface than is the thin-film coil;
   wherein an upper surface of the opposing insulating layer is flat and levels with the upper surface of the non-expandable part and the upper surface of the turn parts; and
   wherein the non-expandable part is further formed between the opposing insulating layer and the thin-film coil.

3. A thin-film magnetic head according to claim 1,
   wherein the non-expandable part is further formed between the front shield part and the thin-film coil.

4. A thin-film magnetic head according to claim 1,
   wherein the non-expandable part is further formed between the rear shield part and the thin-film coil.

5. A thin-film magnetic head according to claim 1,
   wherein non-expandable parts are further formed between the front shield part and the thin-film coil and between the rear shield part and the thin-film coil, respectively.

6. A thin-film magnetic head according to claim 5, further comprising a displacement suppression layer formed from a nonmagnetic material so as to cover the connecting shield part.

7. A thin-film magnetic head according to claim 6, further comprising a protective layer completely covering the displacement suppression layer.

8. The thin-film magnetic head according to claim 1, wherein the thin-film coil comprises an upper thin-film coil and a lower thin-film coil.

9. The thin-film magnetic head according to claim 8, wherein the non-expandable part comprises upper non-expandable part and lower non-expandable part.

10. A thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate;
   wherein the thin-film coil has a plurality of turn parts arranged at respective positions having different distances from the medium-opposing surface;
   wherein a non-expandable part made of an insulating material having a coefficient of thermal expansion smaller than that of a photosensitive resin is formed between the turn parts, an upper surface of the non-expandable part being level with an upper surface of the turn parts;
   wherein the write shield layer has a front shield part, a rear shield part, and a connecting shield part connecting the front and rear shield parts to each other;
   wherein the front shield part, the connecting shield part and the rear shield part are distanced from the medium-opposing surface, an upper surface of the front shield part being level with an upper surface of the rear shield part;
   wherein the front shield part is closer to the medium-opposing surface than is the thin-film coil;
   wherein the rear shield part is further from the medium-opposing surface than is the thin-film coil; and
   wherein the non-expandable part is further formed between the rear shield part and the thin-film coil,
   the thin-film magnetic head further comprising an interlayer insulating layer in contact with the thin-film coil and non-expandable part between the front and rear shield parts, the interlayer insulating layer making contact with both the upper surface of the non-expandable part and the upper surface of the turn parts.

11. A thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on substrate;
   wherein the thin-film coil has a plurality of turn parts arranged at respective positions having different distances from the medium-opposing surface;
   wherein a non-expandable part made of an insulating material having a coefficient of thermal expansion smaller than that of a photosensitive resin is formed between the turn parts, an upper surface of the non-expandable part being level with an upper surface of the turn parts;
   wherein the write shield layer has a front shield part, a rear shield part, and a connecting shield part connecting the front and rear shield parts to each other;
   wherein the front shield part, the connecting shield part and the rear shield part are distanced from the medium-opposing surface, an upper surface of the front shield part being level with an upper surface of the rear shield part;

wherein the front shield part is closer to the medium-opposing surface than is the thin-film coil;

wherein the rear shield part is further from the medium-opposing surface than is the thin-film coil; and wherein non-expandable parts are further formed between the front shield part and the thin-film coil and between the rear shield part and the thin-film coil, respectively, the thin-film magnetic head further comprising an interlayer insulating layer in contact with the thin-film coil and non-expandable part between the front and rear shield parts.

12. A thin-film magnetic head according to claim 10, wherein the write shield layer further has a routing shield part formed so as to be routed from the rear shield part to the medium-opposing surface side;

wherein the interlayer insulating layer is in contact with the routing shield part.

13. A thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate;

wherein the thin-film coil has a plurality of turn parts arranged at respective positions having different distances from the medium-opposing surface;

wherein a non-expandable part made of an insulating material having a coefficient of thermal expansion smaller than that of a photosensitive resin is formed between the turn parts, an upper surface of the non-expandable part being level with an upper surface of the turn parts;

wherein the write shield layer has a front shield part, a rear shield part, and a connecting shield part connecting the front and rear shield parts to each other;

wherein the front shield part, the connecting shield part and the rear shield part are distanced from the medium-opposing surface, an upper surface of the front shield part being level with an upper surface of the rear shield part;

wherein the front shield part is closer to the medium-opposing surface than is the thin-film coil;

wherein the rear shield part is further from the medium-opposing surface than is the thin-film coil; and wherein the non-expandable part is constituted by SOG (Spin On Glass).

14. A head gimbal assembly comprising a thin-film magnetic head formed on a support and a gimbal for securing the support;

wherein the thin-film magnetic head is constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate;

wherein the thin-film coil has a plurality of turn parts arranged at respective positions having different distances from the medium-opposing surface;

wherein a non-expandable part made of an insulating material having a coefficient of thermal expansion smaller than that of a photosensitive resin is formed between the turn parts, an upper surface of the non-expandable part being level with an upper surface of the turn parts;

wherein the write shield layer is formed with a magnetic material and has a front shield part, a rear shield part, and a connecting shield part connecting the front and rear shield parts to each other, the connecting shield part being in direct contact with both the front shield part and the rear shield part;

wherein the write shield layer further includes an opposing shield part that is in direct contact with the gap layer and opposes the main magnetic pole layer through the gap layer;

wherein the front shield part, the connecting shield part and the rear shield part are distanced from the medium-opposing surface, an upper surface of the front shield part being level with an upper surface of the rear shield part;

wherein the front shield part is closer to the medium-opposing surface than is the thin-film coil; and wherein the rear shield part is further from the medium-opposing surface than is the thin-film coil.

15. A hard disk drive comprising a head gimbal assembly having a thin-film magnetic head and a recording medium opposing the thin-film magnetic head;

wherein the thin-film magnetic head is constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate;

wherein the thin-film coil has a plurality of turn parts arranged at respective positions having different distances from the medium-opposing surface; and wherein a non-expandable part made of an insulating material having a coefficient of thermal expansion smaller than that of a photosensitive resin is formed between the turn parts, an upper surface of the non-expandable part being level with an upper surface of the turn parts;

wherein the write shield layer is formed with a magnetic material and has a front shield part, a rear shield part, and a connecting shield part connecting the front and rear shield parts to each other, the connecting shield part being in direct contact with both the front shield part and the rear shield part;

wherein the write shield layer further includes an opposing shield part that is in direct contact with the gap layer and opposes the main magnetic pole layer through the gap layer;

wherein the front shield part, the connecting shield part and the rear shield part are distanced from the medium-opposing surface, an upper surface of the front shield part being level with an upper surface of the rear shield part;

wherein the front shield part is closer to the medium-opposing surface than is the thin-film coil; and wherein the rear shield part is further from the medium-opposing surface than is the thin-film coil.

16. A thin-film magnetic head constructed such that a main magnetic pole layer having a magnetic pole end face on a side of a medium-opposing surface opposing a recording medium, a write shield layer opposing the main magnetic pole layer on the medium-opposing surface side, a gap layer formed between the main magnetic pole layer and write shield layer, and a thin-film coil wound about the write shield layer or main magnetic pole layer are laminated on a substrate;
- wherein the thin-film coil has a plurality of turn parts arranged at respective positions having different distances from the medium-opposing surface;
- wherein a non-expandable part made of a insulating material having a coefficient of thermal expansion smaller than that or a photosensitive resin is formed between the turn parts, an upper surface of the non-expandable part being level with an upper surface of the turn parts;
- wherein the write shield layer has a front shield part, a rear shield part, and a connecting shield part connecting the front and rear shield parts to each other;
- wherein the front shield part, the connecting shield part and the rear shield part are distanced from the medium-opposing surface, an upper surface of the front shield part being level with an upper surface of the rear shield part;
- wherein the front shield part is closer to the medium-opposing surface than is the thin-film coil; and
- wherein the rear shield part is further from the medium-opposing surface than is the thin-film coil,
- the thin-film magnetic head further comprising an opposing insulating layer arranged closer to the medium-opposing surface than is the thin-film coil,
- wherein the non-expandable part is further formed between the opposing insulating layer and the thin-film coil;
- wherein the opposing insulating layer is arranged in the medium-opposing surface; and
- wherein an upper surface of the opposing insulating layer is level with the upper surface of the thin-film coil.

* * * * *